(12) United States Patent
Aoki et al.

(10) Patent No.: US 8,639,109 B2
(45) Date of Patent: Jan. 28, 2014

(54) STEREOSCOPIC IMAGING APPARATUS

(75) Inventors: Sunao Aoki, Kanagawa (JP); Masahiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 13/365,053

(22) Filed: Feb. 2, 2012

(65) Prior Publication Data
US 2012/0201528 A1 Aug. 9, 2012

(30) Foreign Application Priority Data

Feb. 8, 2011 (JP) ................................. 2011-025304

(51) Int. Cl.
*G03B 35/00* (2006.01)
*H04N 13/02* (2006.01)

(52) U.S. Cl.
USPC ........................................... 396/325; 348/47

(58) Field of Classification Search
USPC ........ 396/325, 322, 324; 348/42, 47; 359/462
See application file for complete search history.

(56) References Cited

FOREIGN PATENT DOCUMENTS

JP 2003-5313 1/2003

*Primary Examiner* — Rochelle-Ann J Blackman
(74) *Attorney, Agent, or Firm* — Frommer Lawrence & Haug LLP; William S. Frommer

(57) ABSTRACT

A stereoscopic imaging apparatus includes: an objective optical system that forms a subject as a real or virtual image. Light beams of the subject, emitted in different paths of the objective optical system by independent optical systems, are imaged again as a parallax image, which is converted into an image signal. A control unit moves a front-side principal point of each of the imaging optical systems, so that the ratio of the length of a perpendicular line from that front-side principal point to the optical axis of the objective optical system with respect to the length of a line connecting the point at which the perpendicular line and the optical axis intersect and the focal point of the objective optical system becomes constant.

9 Claims, 12 Drawing Sheets

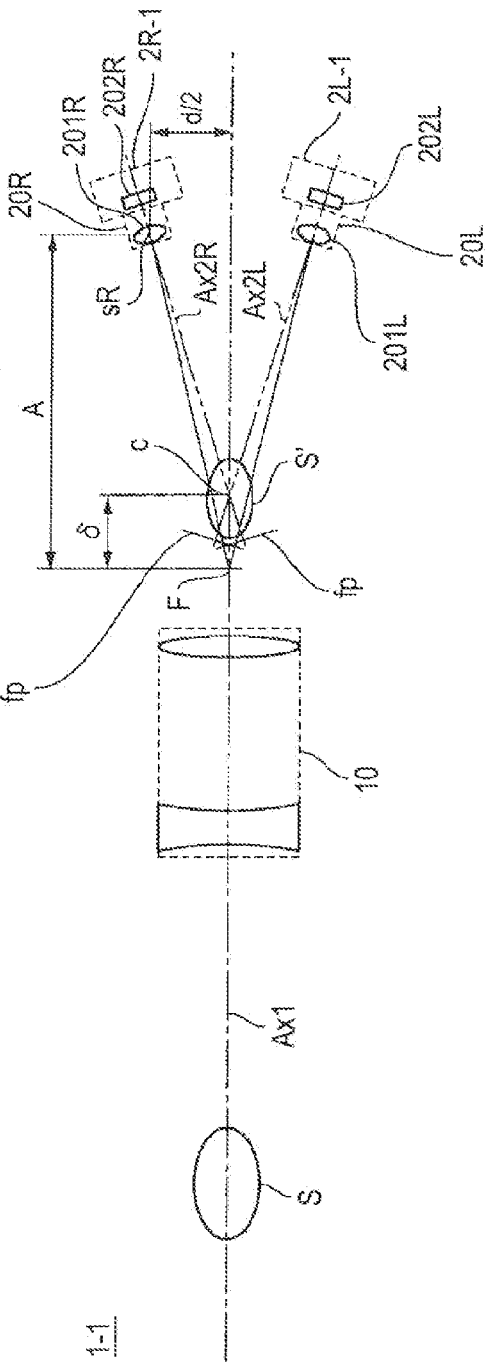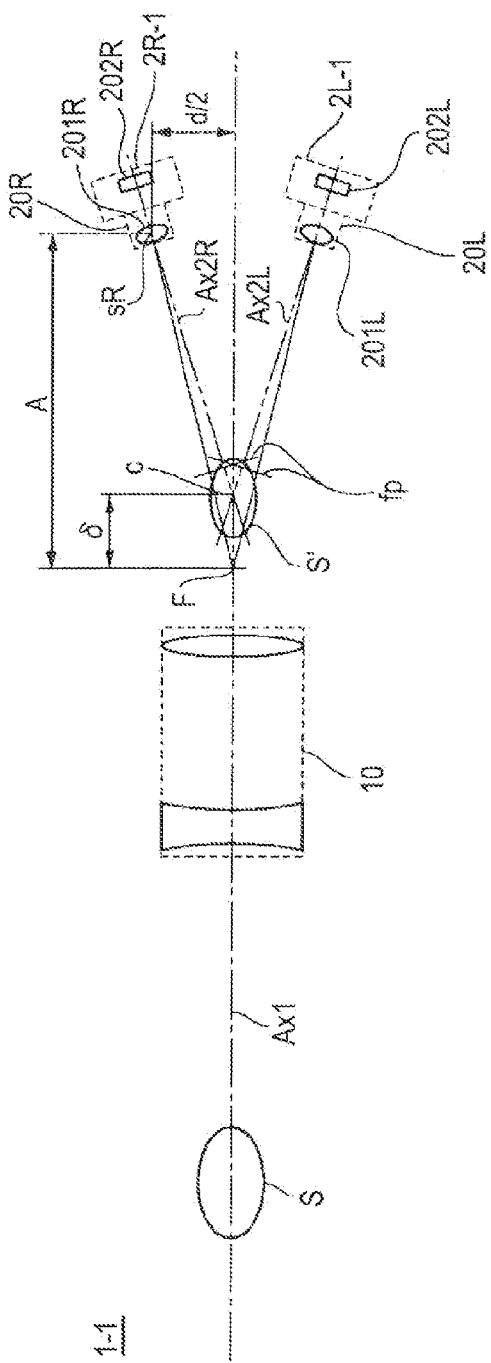
FIG. 3A
FIG. 3B

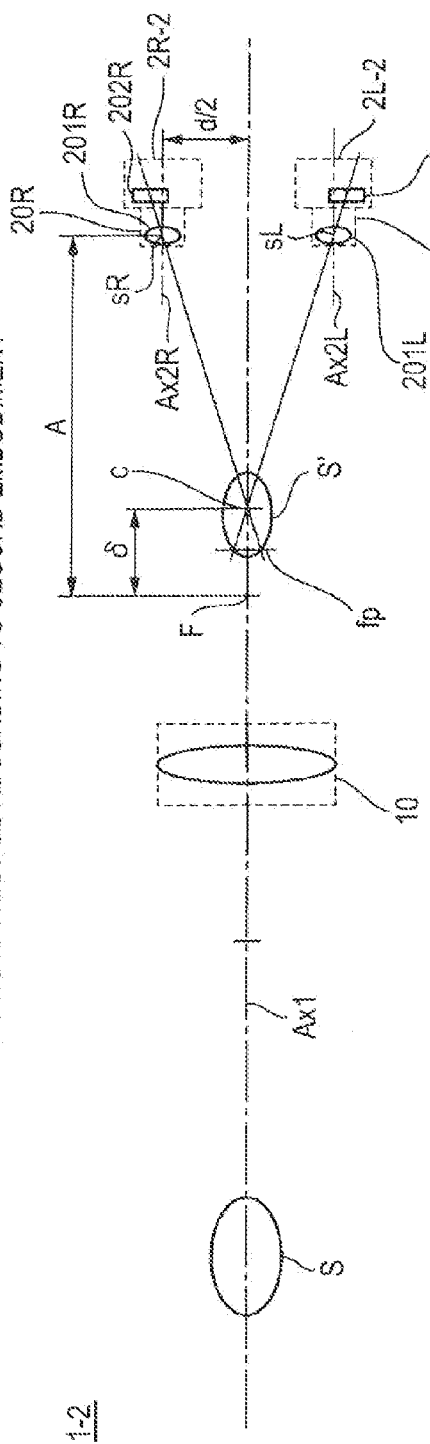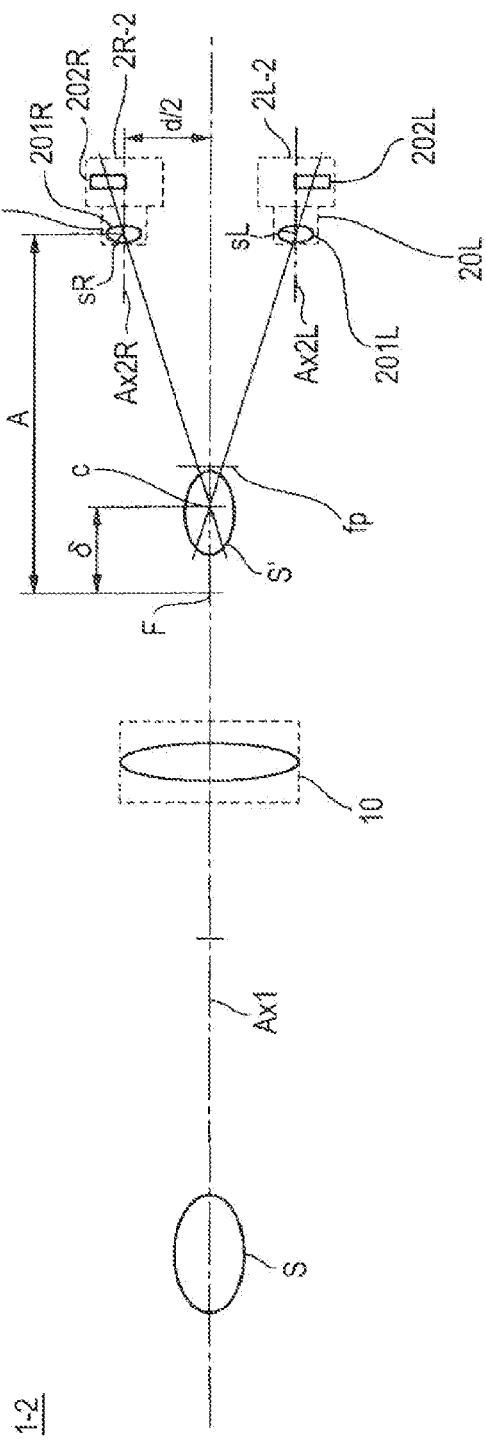

STEREOSCOPIC IMAGING APPARATUS ACCORDING TO FIFTH EMBODIMENT

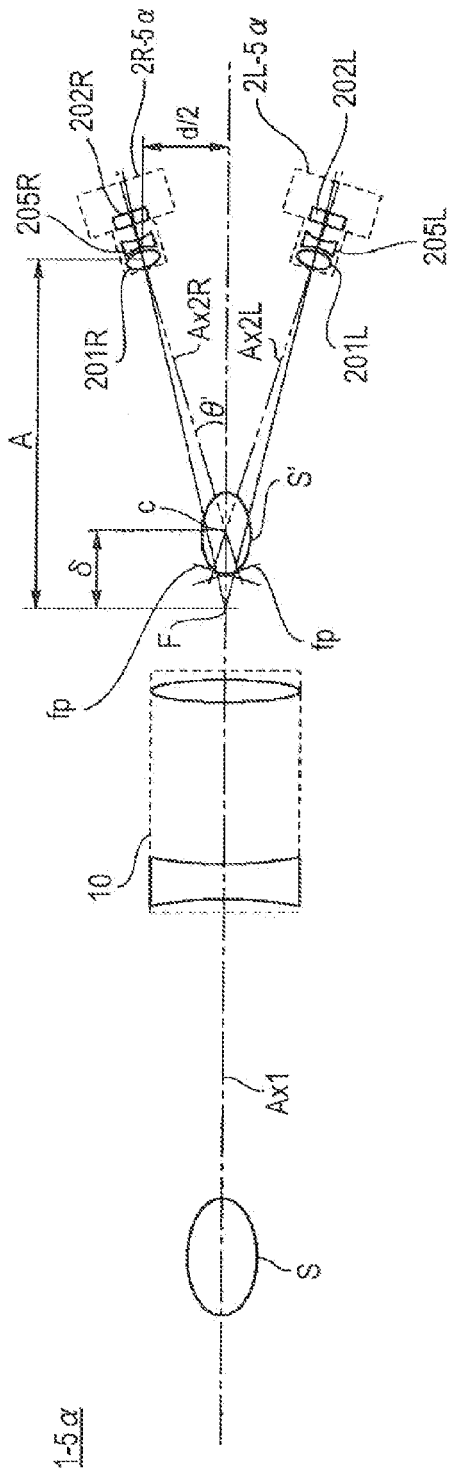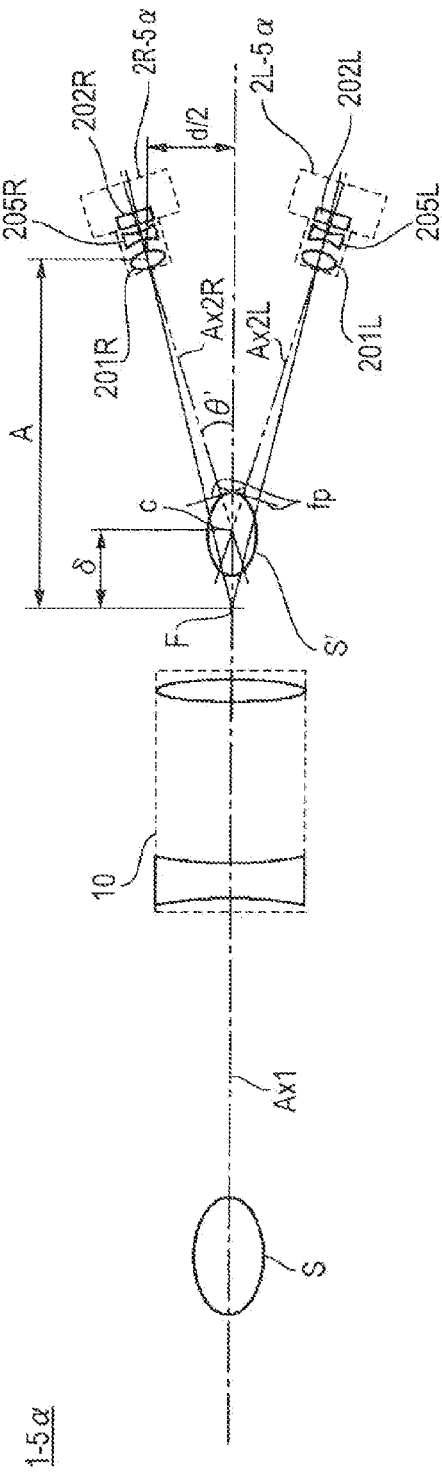

STEREOSCOPIC IMAGING APPARATUS

FIELD

The present disclosure relates to a stereoscopic imaging apparatus that performs photographing of a stereoscopic image, and more particularly, to a focus adjustment, technology at the time of photographing a stereoscopic image.

BACKGROUND

In recent years, demand for a camera (stereoscopic imaging apparatus) that is capable of photographing a 3D (stereoscopic) image has increased. As an imaging method of a stereoscopic image, a beam splitter type (a half mirror type) that performs the photographing by using a half mirror, a side-by-side type (a type for two eyes in parallel) that performs the photographing using two imaging apparatuses that are physically parallel with each other, or the like are disclosed. In such photographing types, an imaging apparatus is mounted on a stand called a rig and performs the photographing, so that a degree of freedom of mounting the imaging apparatus increases. For example, an inter-lens distance (base line length; hereinafter, referred to as "IAD: Inter Axial Distance") of two lenses that are used for photographing the stereoscopic image, convergence, an angle of view, or the like may be selected with a high degree of freedom.

While the degree of freedom is high, there is a problem in that to mount the imaging apparatus on the rig, a lot of effort and time are necessary for setting and adjustment for each photographing. In addition, particularly, the beam splitter type rig becomes a significantly large-scale apparatus, so that there is a problem in that this rig is not appropriate to use for photographing or for interviews in the field.

To solve such a problem, two 2D image photographing cameras that perform the photographing in the side-by-side method are accommodated in a single casing to configure an integral two-eye 3D camera. The integral two-eye 3D camera configured in this way does not need to be assembled, and adjustment of alignment is also not necessary. In addition, due to the compact structure, even in the case of photographing or interviews in the field, there is an advantage in that it is easy to be carried and setup is made within a short time, so that photographing can be started immediately.

However, basically, such an integral two-eye 3D camera is a side-by-side type, so that there is a limit for adjustment of IAD. That is, optical systems or imagers of the two eyes physically interfere with each other, so that it is difficult to make IAD shorter than a constant distance determined by a dispositional position of the optical systems or the imagers. Therefore, for example, in the case of performing the photographing at a position that is very close to a subject, a parallax at the time of displaying on a 3D display located at a position of substantially several meters behind the subject exceeds a parallax range allowing people to comfortably view a 3D image.

As a case where the distance between the subject and the imaging apparatus is very short, for example, interview photographing of a person or photographing at the time of sport relay broadcasting in a backyard may be considered. In this case, the distance between the subject and the imaging apparatus is substantially 1 to 2 m, a convergence point is adjusted to a distance of 1 to 2 m. The most useful IAD in this case, which allows a parallax to be within a range in which people can comfortably view a 3D image, is 10 to 40 mm. However, in present integral two-eye 3D cameras, it is difficult to realize such a short IAD while maintaining image quality and functions, that is, without making a diameter of a lens or a size of the imager small.

In the case of performing the photographing with the above-described beam splitter type, two imaging apparatuses do not physically interfere with each other, so that it is possible to make IAD very short. However, as described above, there is a problem in that a lot of effort and time are necessary for setting and adjustment for each photographing. Therefore, there is still a problem in that this beam splitter type is not appropriate for interview photographing of a person or photographing at the time of sport relay broadcasting in a backyard.

For example, in JP-A-2003-5313, there is disclosed a stereoscopic imaging apparatus that is capable of adjusting the convergence point to an arbitrary position while a focus point of a camera is coincident with the convergence point of two eyes. When using this apparatus, it is possible to perform the photographing in a state where IAD is made to be the same as a pupil distance. Therefore, even when performing the photographing in the proximity of the subject, it is possible to photograph images from which a natural stereoscopic effect can be obtained.

SUMMARY

However, when analyzing the contents disclosed in JP-A-2003-5313, it is considered that an objective optical system is provided, so that a virtual pupil corresponding to a pupil of an imaging optical system is formed at the subject side (object side) in relation to the pupil of the imaging optical system. The virtual pupil is a point through which entire light beams, which pass through the objective optical system and pass through a lens center of the imaging optical system among light beams emitted from the subject, pass. That is, images formed in an imaging device of the imaging optical system become images equivalent to images photographed using the virtual pupil as a pupil (hereinafter, this virtual pupil is referred to as an "effective pupil"). Therefore, a distance between two effective pupils can be referred to as an actual IAD of the stereoscopic imaging apparatus. This actual IAD (hereinafter, referred to as an "effective IAD") may be calculated by the following formula.

Effective IAD=$|f/(L-f)|\times d$

In the formula, "f" represents a focal length of the objective optical system, "L" represents a distance from a rear-side principal point of the objective optical system to a front-side principal point of the imaging optical system. In addition, "d" represents a real IAD determined by an inter-lens distance of two imaging optical systems.

As shown by the formula, as the focal length f of the objective optical system or the distance L from the rear-side principal point of the objective optical system, to the front-side principal point of the imaging optical system varies, the effective IAD also varies. According to the technology disclosed in JP-A-2003-5313, the convergence point is adjusted to an arbitrary position while the focus point is coincident with the convergence point, so that the length L from the rear-side principal point, of the objective optical system to the front-side principal point of the imaging optical system varies at the each time of performing the adjustment. Due to this, the effective IAD also varies. As the effective IAD varies, an amount of parallax in a parallax image obtained by the stereoscopic imaging apparatus also varies. In addition, as the amount of parallax varies, a stereoscopic effect of the image also varies. Like the technology disclosed in JP-A-2003-

5313, when the focus adjustment is performed in a state where the focus point is coincident with the convergence point, the resultant images become images that impose a burden on the viewer who views the images.

Thus, it is desirable to adjust a focus position without changing a distance between virtual pupils formed by a stereoscopic imaging apparatus.

An embodiment of the present disclosure is directed to a stereoscopic imaging apparatus including an objective optical system having a function of forming a subject as a real image or a virtual image. In addition, the stereoscopic imaging apparatus includes a plurality of imaging optical systems that allow a plurality of light beams of the subject, which are emitted in different paths of the objective optical system by a plurality of independent optical systems, to be imaged again as a parallax image, respectively. In addition, the stereoscopic imaging apparatus includes a plurality of imaging devices that are provided in correspondence with the plurality of imaging optical systems, and convert the parallax image that is imaged by the plurality of imaging optical systems into an image signal. In addition, a control for disposing or moving a front-side principal point of each of the imaging optical systems is performed so that a ratio of a length of a perpendicular line vertically drawn from each front-side principal point of the plurality of imaging optical systems to an optical axis of the objective optical system with respect to a length of a line segment connecting an intersection point at which the perpendicular line and the optical axis of the objective optical system intersect each other and a focal point of the objective optical system becomes constant.

According to this configuration, even when various parameters are changed due to focus adjustment, the distance between the virtual pupils formed by a stereoscopic imaging apparatus is not changed. That is, it is possible to perform the focus adjustment without changing the distance between the virtual pupils.

BRIEF DESCRIPTION OF THE DRAWINGS

FIGS. 3A and 3B are schematic diagrams illustrating a configuration example of the stereoscopic imaging apparatus according to a first embodiment, of the present disclosure, in which FIG. 3A illustrates an example in which an imaging device is disposed at a position close to an imaging optical system, and FIG. 3B illustrates an example in which the imaging device is moved from, the position shown in FIG. 3A in a direction to be distant from the imaging optical system;

FIGS. 4A and 4B are schematic diagrams illustrating a configuration example of the stereoscopic imaging apparatus according to a second embodiment of the present disclosure, in which FIG. 4A illustrates an example in which the imaging device is disposed at a position close to the imaging optical system, and FIG. 4B illustrates an example in which the imaging device is moved from the position shown in FIG. 4A in a direction to be distant from the imaging optical system;

FIGS. 5A to 5C are schematic diagrams illustrating a configuration example of the stereoscopic imaging apparatus according to a third embodiment of the present disclosure, in which FIG. 5A illustrates an example in which a convergence angle-variable lens is shifted to a position distant from an optical axis of the imaging optical system, FIG. 5B illustrates an example in which the convergence angle-variable lens is shifted from the position shown in FIG. 5A to the side of the optical axis of an objective optical system, and FIG. 5C illustrates an example in which an imaging device is moved from the positions shown in FIGS. 5A and 5B in a direction to be distant from the imaging optical system;

FIGS. 6A and 6B are schematic diagrams illustrating a configuration example of the stereoscopic imaging apparatus according to a fourth embodiment of the present disclosure, in which FIG. 6A illustrates an example in which an imaging section is disposed at a position distant from a spatial image, and FIG. 6B illustrates an example in which the imaging section is moved from the position shown in FIG. 6A in a direction to be close to the spatial image;

FIGS. 7A and 7B are schematic diagrams illustrating a configuration example of the stereoscopic imaging apparatus according to a modification of the fourth embodiment of the present disclosure, in which FIG. 7A illustrates an example in which the imaging section is disposed at a position distant from the spatial image, and FIG. 7B illustrates an example in which the imaging section is moved from the position shown in FIG. 7A in a direction to be close to the spatial image;

FIGS. 8A and 8B are schematic diagrams illustrating a configuration example of the stereoscopic imaging apparatus according to a fifth embodiment of the present disclosure, in which FIG. 8A illustrates an example in which the imaging section is disposed at a position distant from the spatial image and the imaging device is disposed at a position close to the imaging optical system, and FIG. 8B illustrates an example in which the imaging section is moved from the position shown in FIG. 8A in a direction to be close to the spatial image, and the imaging device is moved in a direction to be distant from the imaging optical system and in a direction to be distant from the optical axis of the objective optical system;

FIGS. 9A and 9B are schematic diagrams illustrating a configuration example of the stereoscopic imaging apparatus according to a modification of the fifth embodiment of the present disclosure, in which FIG. 9A illustrates an example in which a focusing lens is disposed at a position close to an imaging lens, and FIG. 9B illustrates an example in which the focusing lens is moved from the position shown in FIG. 9A in a direction to be close to the imaging device;

DETAILED DESCRIPTION

Hereinafter, an embodiment for carrying out the present disclosure will be described. In addition, the description will be made in the following order.

1. Configuration Example of Stereoscopic Imaging apparatus

2. First Embodiment (an example of a configuration in which a position of a principal point of an imaging optical system is fixed and only a position of an imaging device is made to move so as to perform focus adjustment)

3. Second Embodiment (an example of a configuration in which a position of the imaging device is positioned to be shifted with respect to a position of a lens of the imaging optical system, and only the position of the imaging device is made to move so as to perform the focus adjustment)

4. Third Embodiment (an example of a configuration in which adjustment of a convergence point is performed by using a convergence angle-variable lens, and the position of the imaging device is made to move so as to perform the focus adjustment)

5. Fourth Embodiment (an example of a configuration in which a position of a principal point of the imaging optical system is made to move, and along with this movement, a posture of an imaging section is controlled so as to perform the focus adjustment)

6. Modification of Fourth Embodiment (an example of a configuration in which the position of the principal point of the imaging optical system is made to move along a line connecting the principal point of the lens of the imaging optical system and the convergence point so as to perform the focus adjustment)

7. Fifth Embodiment (an example of a configuration in which the position of the principal point of the imaging optical system is made to move, and along with this movement, the imaging device is made to move in a direction to be distant from an optical axis of an objective, optical system so as to perform the focus adjustment)

8. Modification of Fifth Embodiment (an example of a configuration in which a lens in which a position of a front-side principal point is barely moved at the time of the focus adjustment is used as a lens of the imaging optical system)

9. Modifications of First to Fifth Embodiments

1. Configuration Example of Stereoscopic Imaging Apparatus

Figure 1:
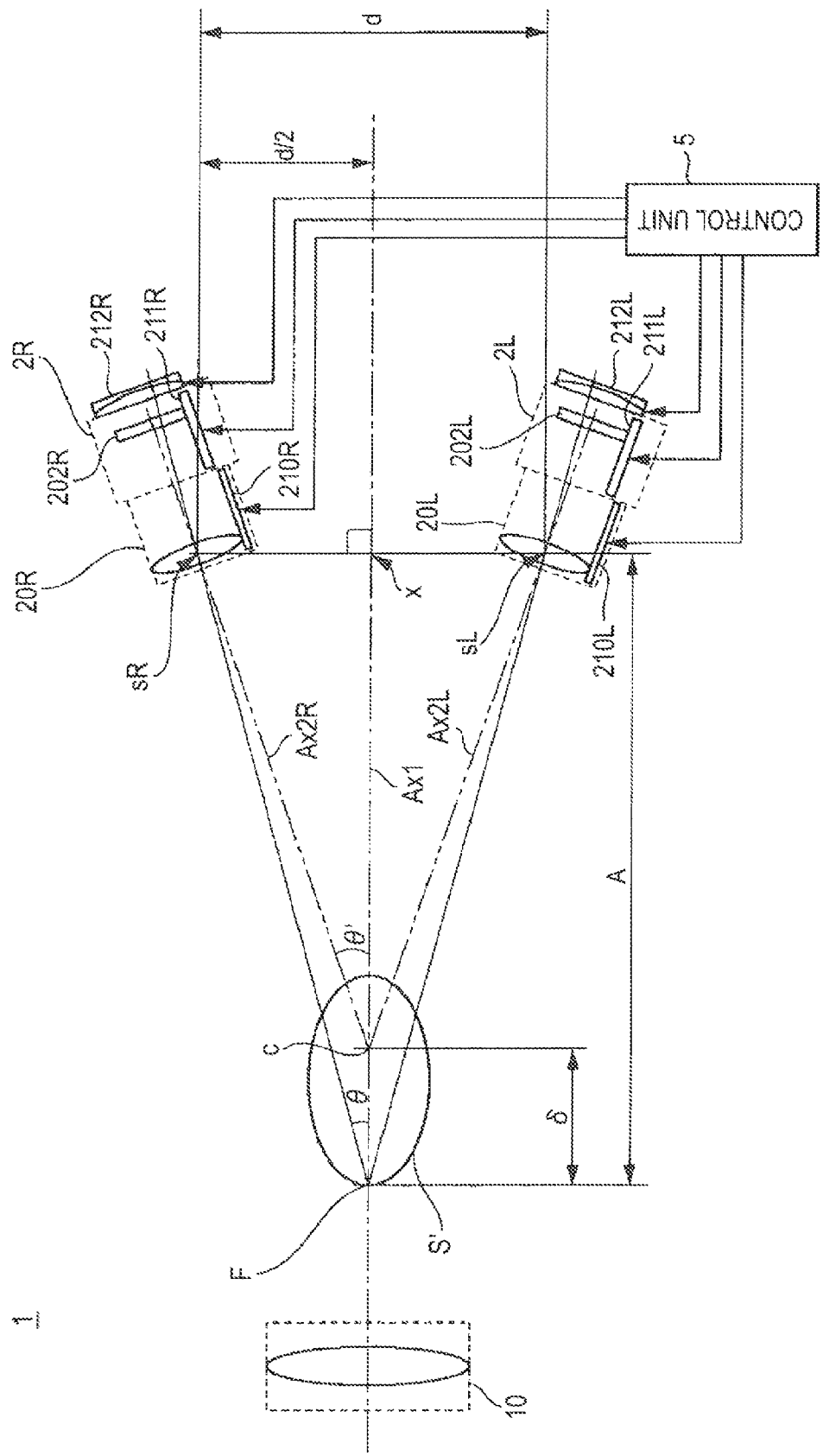
FIG. 1 is a schematic diagram illustrating a configuration example of a stereoscopic imaging apparatus according to an embodiment of the present disclosure.

In FIG. 1, a configuration example of a stereoscopic imaging apparatus 1 according to an embodiment of the present disclosure is illustrated. With reference to the stereoscopic imaging apparatus 1 shown in FIG. 1, a basic configuration and a focus adjustment operation that are common to first to fifth embodiments described later will be described. The stereoscopic imaging apparatus 1 includes an objective optical system 10 and two imaging sections 2R and 2L. The objective optical system 10 has a function of imaging a subject S (not shown) as a real image. In addition, the imaging sections 2R and 2L allow a plurality of light beams of the subject, which are emitted in different paths of the objective optical system 10, to be imaged again as a parallax image, respectively, and convert this imaged image into an image signal. The imaging section 2R includes an imaging optical system 20R and an imaging device 202R, and the imaging section 2L includes an imaging optical system 20L and an imaging device 202L.

In addition, in an example shown in FIG. 1, for the easy understanding of the explanation, the objective optical system 10 is shown as a thin lens having a focal length f. In practice, the objective optical system 10 includes a plurality of pieces and a plurality of groups of lenses, filter, aperture, lens driving mechanism, or the like. Furthermore, in addition to this mechanism, the objective optical system 10 may have a zooming function, a focus adjustment function, and other functions. In practice, the imaging optical systems 20R and 20L may also have a plurality of pieces and a plurality of groups of lenses, filter, aperture, lens driving mechanism, or the like, and may have the zooming function, a focus adjustment function, or other functions.

In a configuration shown in FIG. 1, the objective optical system 10 and the imaging optical systems 20R and 20L are disposed in such a manner that an optical axis Ax1 of the objective optical system 10, an optical axis Ax2R of the imaging optical system 20R, and an optical axis Ax2L of the imaging optical system 20L are present on the same plane. The imaging sections 2R and 2L are disposed in such a manner that the optical axis Ax2R of the imaging optical system 20R, and the optical axis Ax2L of the imaging optical system 20L intersect each other on the optical axis Ax1 of the objective optical system. In addition, the imaging sections 2R and 2L are disposed at symmetrical positions interposing the optical axis Ax1 of the objective optical system 10.

In addition, an intersection point c at which the optical axis Ax2R of the imaging optical system 20R and the optical axis Ax2L of the imaging optical system 20L intersect each other on the optical axis Ax1 of the objective optical system serves as a convergence point of the stereoscopic imaging apparatus 1. In the example shown in FIG. 1, the convergence point c is set at a position deviated from a focal point F of the objective optical system 10 by a distance $\delta$. It is assumed that a positional relationship between the imaging optical system 20R (20L) and an imaging device 202R (202L) in the imaging section 2R (2L) is adjusted to a position in which an optimal imaging can be obtained at the position of the convergence point. In addition, in the following description, in a case where it is not necessary to describe by particularly distinguishing between a left side (L) and a right side (R) with respect to each configuration in the imaging sections such as a case where a disposition or an operation is the same as each other in the left side and the right side, it is described with an indication like an imaging section 2, an imaging optical system 20, an imaging device 202, a front-side principal point s, and an optical axis Ax2.

In addition, the stereoscopic imaging apparatus 1 includes a motor 210R (210L) that drives a lens of the imaging optical system 20R (20L), and an imaging device position controlling unit 211R (211L) that moves a position of the imaging device 202R (202L). In addition, the stereoscopic imaging apparatus 1 includes a camera posture controlling unit 212R (212L) that makes the posture of the imaging section 2R (2L) vary. Furthermore, the stereoscopic imaging apparatus 1 includes a control unit 5 that supplies a control signal with respect to the lens driving motors 210R and 210L, the imaging device position controlling units 211R and 211L, and the camera posture controlling units 212R and 212L. In addition, the stereoscopic imaging apparatus 1 may be configured to include all of these units, but may be configured to include only a minimum configuration according to an embodiment.

According to the stereoscopic imaging apparatus 1 configured as described above, an image of a subject S distant by an infinite distance is imaged at an image-side focal position F of the objective optical system 10, and an image of a subject distant by a finite distance is imaged at the rear side (at the side of the imaging devices 202R and 202L) according to a distance from the objective optical system 10 in relation to the focal point F. In addition, for convenience of explanation, a case where a real image is formed by the objective, optical system 10 and the imaging optical systems 20R and 20L is described as an example, but is not limited to this.

2. With Respect to Effective Pupil Formed by Stereoscopic Imaging Apparatus 1

Figure 2:
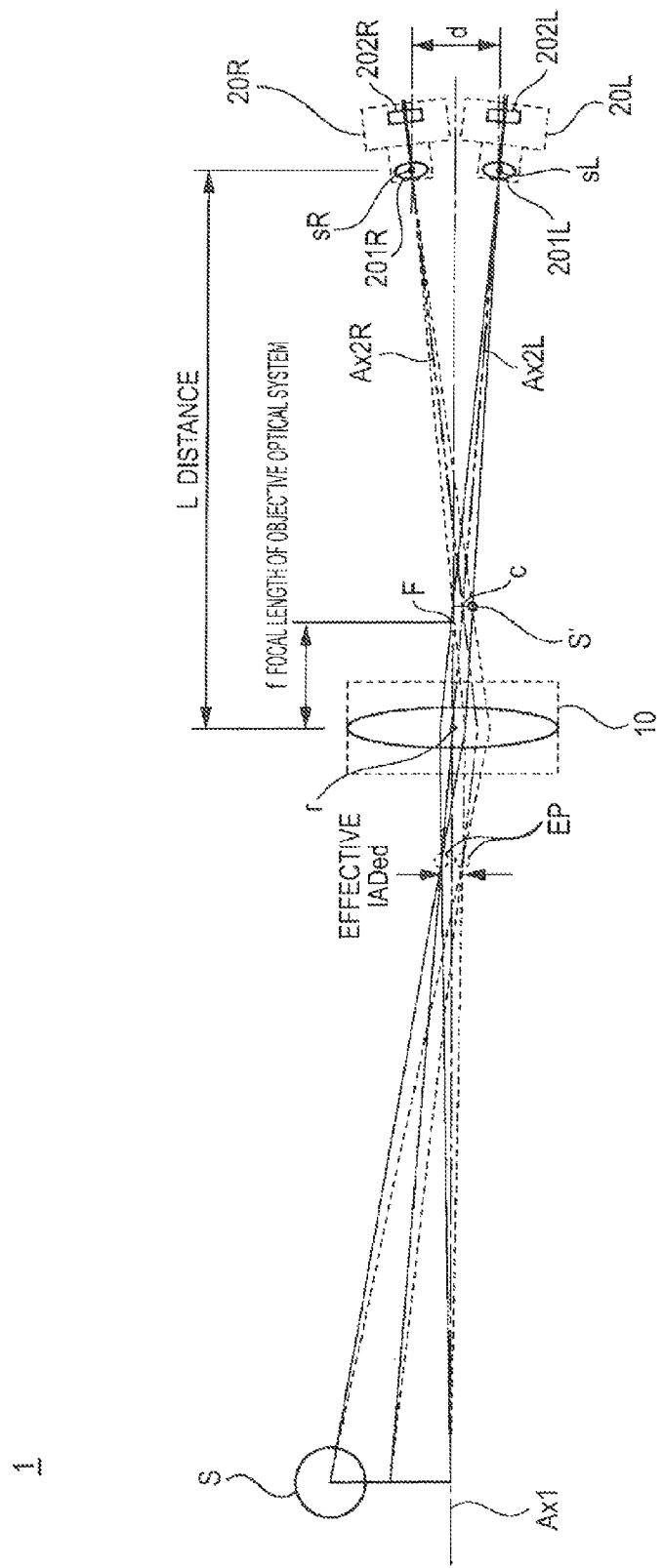
FIG. 2 is an explanatory diagram illustrating an effective pupil and an effective IAD, which are formed by a stereoscopic image according to an embodiment of the present disclosure.

Next, description will be made with respect to an effective pupil formed by the stereoscopic imaging apparatus 1 with reference to FIG. 2. FIG. 2 shows an optical path diagram illustrating paths that are followed by light beams which pass principal points of the lenses of the imaging optical systems 20R and 20L among light beams emitted from the subject S. In FIG. 2, these light beams are indicated by three representative light beams that are emitted from three different positions of the subject S. A light beam passing through a front-side principal point sR of the imaging optical system 20R is indicated by a broken line, and a light beam passing through a front-side principal point sL of the imaging optical system 20L is Indicated by a solid line.

When passing through the objective optical system 10, the light beams emitted from the subject S are imaged again between the objective optical system 10 and the imaging optical systems 20R and 20L. When viewing the subject with the lenses of the imaging optical systems 20R and 20L set as a point of view, it looks as if an object is present at a position between the objective optical system 10 and the imaging optical systems 20P and 20L, so that an image that can be made at this position is referred to as a spatial image. The light beams which have passed through the position at which the spatial image S' shown in FIG. 2 is formed are guided to two imaging optical systems 20R and 20L and are imaged on the imaging plane (not shown) of the imaging devices 202R and 202L, and these images serve as parallax images, respectively.

In addition, when it is assumed that light beams are emitted from a lens center of the imaging optical, systems 20R and 20L, the light beams emitted from the subject S follow the same path as which the light beams emitted from the lens center follow. Therefore, it is easy to understand when it is considered with respect to the light beams emitted from the lens center of the imaging optical systems 20R and 20L. The light beams emitted from the lens center of the imaging optical systems 20R and 20L reach the lens of the objective optical system 10 after passing through one point, of the spatial image S', and propagate toward one point of the subject S (corresponding to the one point of the spatial image S'). At this time, it can be seen that the light beams which have passed through the lens of the objective optical system 10 meet again at one point while reaching the subject S.

That is, this one point can be said to be a point through which all of the light beams passing through the lens center of the imaging optical systems 20R and 20L pass. Therefore, images that are imaged on the imaging plane of the imaging device 202R of the imaging optical system 20R and the imaging plane of the imaging device 202L of the imaging optical system 20L are equivalent to an image photographed with the "one point" used as a pupil. That is, this "one point" is considered as an actual pupil (effective pupil EP) in the stereoscopic imaging apparatus 1. Therefore, a distance between respective effective pupils EP formed by the left and right imaging optical systems 20R and 20L can be said to be an actual IAD (hereinafter, referred as an effective IADed) in the stereoscopic imaging apparatus 1.

The effective IADed is expressed by the following formula 1.

$$\text{Effective } IADed = f/(L-f) \times d \quad \text{(formula 1)}$$

In the formula 1, "f" represents a focal length of the objective optical system 10, "L" represents a distance from a rear-side principal point r of the objective optical system 10 to a front-side principal point sR of the imaging optical system 20R and a front-side principal point sL of the imaging optical system 20L. In addition, as shown in FIG. 3, in a case where the lens of the objective optical system 10 is idealized as a thin lens, a front-side principal point and the rear-side principal point are not distinguished from each other and the front-side principal point and the rear-side principal point are coincident with each other, "d" is a physical IAD (hereinafter, referred to as an "IADd") that is determined by a dispositional position of the imaging optical system 20R and the imaging optical system 20L.

For example, the focal length f of the objective optical system 10 is set to 70 mm, and the distance L is set to 370 mm. In addition, the imaging optical system 20R and the imaging optical system 20L are disposed to be distant from each other by a distance d of 60 mm with the optical axis Ax1 of the objective optical system 10 made as a symmetrical axis (IADd=60 mm). In this case, the effective IADed is calculated by the above-described formula 1 as 14 mm. That is, according to the stereoscopic imaging apparatus 1 of the embodiment of the present disclosure, the effective IADed becomes shorter (14 mm) than the physical IADd (60 mm) by f/(L−f) times.

Therefore, when the focal length f and the distance L of the objective optical system 10 are set so as to satisfy the following formula 2, it is possible to make the effective IADed shorter than the physical IADd obtained by the dispositional position of the imaging optical systems 20R and 20L. In addition, in the following formula, it is assumed that a convex lens is used as the lens of the objective optical system 10, and the focal length f becomes a positive value (f>0).

$$f/(L-f) \leq 1 \quad \text{(formula 2)}$$

Returning again to FIG. 1, description will be given with respect to a focus adjustment method by the stereoscopic imaging apparatus 1. This focus adjustment method is common to each embodiment described later. In FIG. 1, a distance (physical distance IAD) between the front-side principal point sR of the imaging optical system 20R and the front-side principal point sL of the imaging optical system 20L is set to d, and an intersection point between the optical axis Ax1 and a perpendicular line drawn from the front-side principal point sR (sL) of the imaging optical system 20R (20L) to the optical axis Ax1 of the objective optical system 10 is set as an intersection point x. In addition, a distance between the focal point F of the objective optical system 10 and the intersection point x is set to a distance A.

In addition, an angle made by a line connecting the focal point F of the objective optical system 10 and the front-side principal point sR (sL) of the lens of the imaging optical system 20 and the optical axis Ax1 of the objective optical system 10 is set to θ. In addition, an angle made by the optical axis Ax2 of the imaging optical system 20 (or a straight line connecting the rear-side principal point of the lens of the imaging optical system 20 and a center of the imaging device 202) and the optical axis Ax1 of the objective optical system 10 is set to θ'.

The positions of the front-side principal point sR of the imaging optical system 20R and the front-side principal point sL of the imaging optical system 20L are adjusted to positions in which an optimal parallax amount can be obtained at the time of photographing the subject S that is distant by an arbitrary photographing distance. That is, the physical IADd determined by a distance between principal points of both imaging optical systems is set to an arbitrary distance. In this state, it is considered a case where a focus position is made to move to an arbitrary position of the subject S. To perform the focus adjustment without changing the effective IADed, it is preferable for "tan θ=d/2A" not to be changed through the focus adjustment.

For example, when the focus adjustment is performed with the positions of the front-side principal point sR of the imaging optical system 20R and the front-side principal point sL of the imaging optical system 20L being fixed, the distance A and the length 2/d of the perpendicular line are not changed. In addition, in a case where the focus adjustment is performed by moving the positions of the front-side principal point sR of the imaging optical system 20R and the front-side principal point sL of the imaging optical system 20L, this movement is performed along a straight line connecting the focal point F of the objective optical system 10 and the front-side principal point s of the imaging optical system 20. In this manner, it is possible to maintain "tan θ−d/2A" at a constant value.

In a case where the focus adjustment is performed by moving the positions of the front-side principal point sR of the imaging optical system 20R and the front-side principal point sL of the imaging optical system 20L, when an angle of convergence of the stereoscopic imaging apparatus 1 is adjusted in accordance with a value of the distance A, it is possible to perform the focus adjustment without changing the position of the convergence point. More specifically, an angle θ made by the optical axis Ax2 of the imaging optical system 20 and the optical axis Ax1 of the objective optical system 10 is adjusted so as to satisfy the following formula (formula 3).

Angle θ'=arctan (d/2(A−δ))   (formula 3)

The adjustment of the angle θ' may be performed by controlling a posture of the imaging section 2, or by controlling a position of the front-side principal position s of the imaging optical system 20 and a position (posture) of the imaging device 202. In addition, even in a case where the stereoscopic imaging apparatus 1 is configured in such a manner that the optical axis Ax2 of the imaging optical system 20 and a line connecting the front-side principal point s of the imaging optical system 20 and a center line of the imaging device 202 are not coincident with each other, the same control may be performed. In this case, the angle θ' made by a light beam passing through the front-side principal point s of the imaging optical system 20 and the center of the imaging device 202 and the optical axis Ax1 of the objective optical system 10 may be adjusted.

In any configuration, the focus adjustment is performed by making the imaging optical system 20R and the imaging optical system 20L move in conjunction with each other so that the distance A in the imaging optical system 20R and the distance A in the imaging optical system 20L are the same as each other at any time. Here, the focus adjustment represents adjustment in which an object plane (focus plane) is made to move within a range of a finite distance. That is, the focus adjustment represents adjustment of a range that can be performed by a rear-stage imaging optical system 20 (and/or imaging device 202).

3. First Embodiment

A stereoscopic imaging apparatus 1-1 according to a first embodiment of the present disclosure will be described with reference to FIGS. 3A and 3B. As shown in FIGS. 3A and 3B, the objective optical system 10 includes a concave lens and a convex lens. Similarly to the configuration shown in FIG. 1, the imaging sections 2R and 2L are disposed in such a manner that the optical axis Ax2R of the imaging optical system 20R and the optical axis Ax2L of the imaging optical system 20L intersect each other on the optical axis Ax1 of the objective optical system.

The optical axis Ax2R of the imaging optical system 20R and the optical axis Ax2L of the imaging optical system 20L are made to intersect with each other at a position (intersection point c) on the optical axis Ax1 of the objective optical system, which is distant from the focal point F by a distance δ. The position of the intersection point c is adjusted to be set within a range in which the spatial image S' is formed by the stereoscopic imaging apparatus 1-1. In addition, an image located at a position corresponding to the intersection point c in the spatial image S' is acquired by the left and right imaging sections 2L and 2R as an image in which, a binocular parallax is zero. That is, this intersection point c becomes a convergence, point of the stereoscopic imaging apparatus 1-1.

A positional relationship between the imaging optical system 20 and the imaging device 202 is set to a positional relationship in which the optical axis Ax2 of the imaging optical system 20 and the line connecting the rear-side principal point of the imaging optical system 20 and the center of the imaging device 202 are coincident with each other. That is, the imaging device 202 is disposed so that the imaging plane thereof is orthogonal to the optical axis Ax2 of the imaging optical system 20. In addition, the imaging device 202 is configured so as to move along the optical axis Ax2 of the imaging optical system 20.

Next, a focusing operation by the stereoscopic imaging apparatus 1-1 will be described with reference to FIGS. 3A and 3B. It is possible to focus at an arbitrary position of a spatial image by fixing the position of the principal point s of the imaging optical system 20 and by moving only the imaging device 202 along the optical axis Ax2 of the imaging optical system 20. For example, from a state where the imaging device 202R (202L) is disposed to be close to the imaging optical system 20R (20L) as shown in FIG. 3A, the imaging device 202R (202L) is made to move along the optical axis Ax2 in a direction so as to be distant from the imaging optical system 20R (20L) as shown in FIG. 3B. Due to this operation, focus planes fp of the imaging sections 2R and 2L move from the side of the focal point F of the objective optical system 10 toward the side of the imaging optical system 20R (20L).

In addition, it is necessary for the control of the imaging device 202R and the control of the imaging device 202L to be performed in conjunction with each other. These controls may be performed by making the control unit 5 (see FIG. 1) control each imaging device position controlling unit 211R (211L) of the imaging devices 202R and 202L, or by making driving mechanisms of the respective imaging devices 202 mechanically move in conjunction with each other. The control of the position of the imaging devices 202 may be realized by a method different from these methods.

According to the stereoscopic imaging apparatus 1-1 according to the above-described first embodiment, the focus adjustment is performed by fixing the position of the principal point s of the imaging optical system 20 and by making only the position of the imaging device 202 move. In this manner, the above described "tan θ=d/2A" does not vary due to the focus adjustment. That is, it is possible to perform the focus adjustment without changing the effective IADed.

In addition, according to the stereoscopic imaging apparatus 1-1 of this embodiment, it is possible to make only the focus position (focus plane) move to an arbitrary position of the spatial image S' while the convergence point is being fixed to a predetermined position. That is, it is possible to adjust the focus position to a position different from the convergence point. When a stereoscopic image is displayed on a screen or a display, an image, which is located at the convergence point and in which a parallax is zero, is positioned on the screen. In addition, in a case where a parallax of left and right parallax images is in a cross direction (reverse phase), the parallax images are located in front of the screen, and in a case where the parallax of the left and right parallax images is in the same direction (same phase), the parallax images are located at the rear side of the screen. For example, this can be easily understood when considering the case of photographing a subject that moves in a depth direction of the screen. When expressing the movement of a subject that moves from the screen to the rear side, in a case where the convergence point and the focus position are adjusted in conjunction with each other, the subject is positioned on the screen at any time, and a background that is not in focus, or the like moves in a back and forth direction. This image may give a viewer who is viewing the image a sense of discomfort. According to the stereoscopic imaging apparatus of this embodiment, it is possible to align, the focus position to a position different from the convergence point, so that viewer is not given a sense of discomfort.

In addition, in the above description, for convenience of description of the focus adjustment mainly in the imaging optical system 20, an expression of "a focus position of a spatial image S' is adjusted to an arbitrary position" is described. In practice, it is possible to photograph a subject S that is located from focus distance to infinite distance using a total optical system also including the objective optical system 10. In other words, according to the stereoscopic imaging apparatus 1 of the embodiment of the present disclosure, it is possible to photograph the subject that is located from focus distance to infinite distance by only making the focus plane fp move within a range in which the spatial image S' is formed.

4. Second Embodiment

A stereoscopic imaging apparatus 1-2 according to a second embodiment of the present disclosure will be described with reference to FIGS. 4A and 4B. Similarly to the description in FIG. 3, the spatial image S' is formed at the rear side (at the side of the imaging optical system 20) of the focal position F of the objective optical system 10 by the objective optical system 10. The imaging optical systems 20R and 20L are disposed in such a manner that the optical axis Ax2R of the imaging optical system 20R and the optical axis Ax2L of the imaging optical system 20L are parallel with each other, and these optical axes are parallel with the optical axis Ax1 of the objective optical system 10.

An angle of the imaging device 202 is adjusted in such a manner that, the imaging plane thereof is orthogonal to the optical axis Ax1 of the objective optical system 10. In addition, the imaging device 202 is disposed at a position that is shifted from the optical, axis Ax2 of the imaging optical system 20 in a direction to be distant from the optical axis Ax1 of the objective optical system 10. An amount of shift thereof is adjusted to such an amount that a straight line connecting the rear-side principal point of the imaging optical system 20 and the center of the imaging device 202 intersect each other at a position (intersection point c) at which the spatial image S' on the optical axis Ax1 of the objective optical system 10 is formed.

Next, a focus adjustment operation by the stereoscopic imaging apparatus 1-2 will be described with reference to FIGS. 4A and 4B. Similarly to the configuration shown in FIGS. 3A and 3B, the focus adjustment is performed by fixing the position of the front-side principal position s of the imaging optical system 20, and by making only the position of the imaging device 202 move along a straight line connecting the rear-side principal point of the imaging optical system 20 and the center of the imaging device 202. At this time, in this movement of the imaging device 202, it is necessary for a left side and a right side (imaging device 202R and imaging device 202L) to be moved in conjunction with each other.

Through the above-described operation, the imaging device 202R (202L) moves in a direction to be distant from the imaging optical system 20R (20L) as shown in FIG. 4B from a state in which the imaging device 202R (202L) is located to be close to the imaging optical system 20R (20L) as shown in FIG. 4A. From this movement, the focus planes fp of the imaging sections 2R and 2L move from the side of the focal point f of the objective optical system 10 to the side of the imaging optical system 20R (20L).

As described above, it is possible to obtain the same effect as the first embodiment by performing the focus adjustment in such a manner that the position of the principal point s of the imaging optical system 20 is fixed and only the position of the imaging device 202 is moved. That is, "tan θ=d/2A" does not vary due to the focus adjustment. That is, it is possible to perform the focus adjustment without changing the effective IADed. In addition, it is possible to adjust the focus position to a position different, from the convergence point.

In addition, according to the second embodiment, the imaging plane of the imaging device 202 is disposed to be orthogonal with respect to the optical axis Ax1 of the objective optical system 10 and the optical axis Ax2 of the imaging optical system 20. Therefore, the focus plane is also orthogonal to the optical axis Ax1 and the optical axis Ax2 as described above. In this manner, it is possible to obtain an effect that in left and right parallax images, the focus planes thereof become the same. In the left and right parallax images, when the focus planes thereof become the same, even in a convergence state, a trapezoidal distortion does not occur in images obtained in the left and right imaging sections 2L and 2R. Therefore, it is possible to obtain a preferable parallax image without performing image processing for removing the trapezoidal distortion.

5. Third Embodiment

Figure 5A:
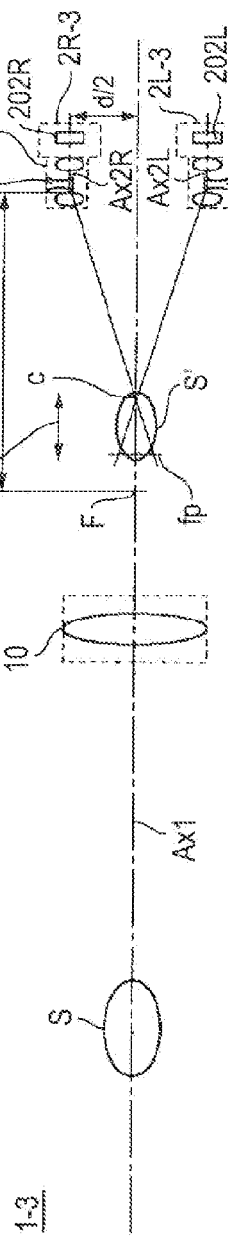
Figure 5B:
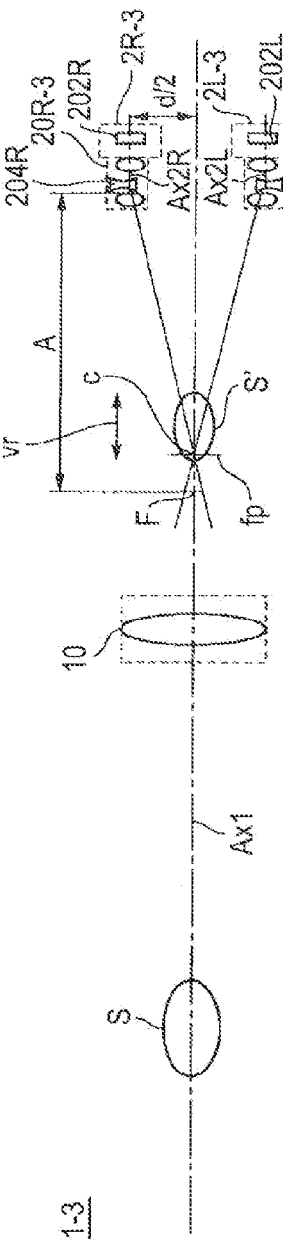
Figure 5C:
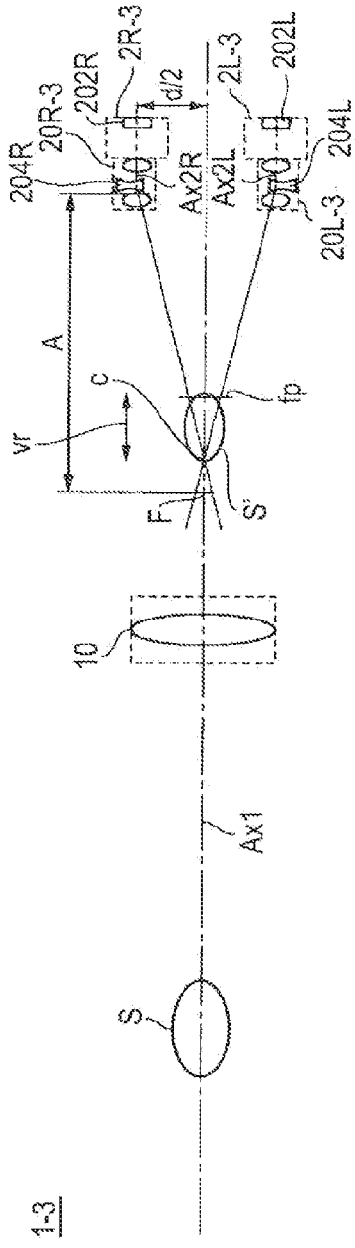

A stereoscopic imaging apparatus 1-3 according to a third embodiment of the present disclosure will be described with reference to FIGS. 5A to 5C. As shown in FIGS. 5A to 5C, in the stereoscopic imaging apparatus 1-3, the imaging sections 2R and 2L are disposed in such a manner that the optical axis of the imaging optical system 20R (20L) is parallel with the optical axis Ax1 of the objective optical system 10. In addition, the imaging optical systems 20R and 20L include convergence angle-variable lenses 204R and 204L, which are formed of a concave lens, respectively.

The convergence angle-variable lens 204R (204L) is configured to be able to be shifted in a direction to be distant from the optical axis Ax1 of the objective optical system 10 with respect to the optical axis Ax2 of the imaging optical system 20. An angle made by the optical axis Ax2 of the imaging optical system 20 and the optical axis Ax1 of the objective optical system 10 varies according to the amount of shift of the convergence angle-variable lens 204. That is, it is possible to change the angle of convergence of the stereoscopic imaging apparatus 1-3. The imaging device 202 is configured to be movable along the optical axis Ax2 of the imaging optical system 20.

Next, a focus adjustment operation by the stereoscopic imaging apparatus 1-3 will be described with reference to FIGS. 5A to 5C. FIGS. 5A and 5B show diagrams illustrating a variation in a position of the convergence angle-variable lens 204 on the optical axis Ax2 of the imaging optical system 20 in a case where the convergence angle-variable lens 204 of the imaging optical system 20 is shifted. In FIG. 5A, the convergence angle-variable lens 204 is disposed at a position that, is greatly distant from the optical axis Ax1 of the objective optical system 10 with respect to the optical axis Ax2 of the imaging optical system 20R. Through this disposition, in the convergence angle-variable lens 204, a position through which light beams pass is changed. Accompanying this, an angle of refraction of light beams that pass through the convergence angle-variable lens 204 becomes large, so that the angle of convergence formed by the imaging optical systems 20R and 20L becomes large. Therefore, a position at which the convergence point c (intersection point c) is formed becomes the rear side of the spatial image S' (at the side of the imaging optical system 20).

As shown in FIG. 5B, when the dispositional position of the convergence angle-variable lens 204 is shifted in a direction so as to be close to the optical axis Ax1 of the objective optical system, the angle of convergence becomes small, and thereby the convergence point c is also formed at a front side of the spatial image S', (in FIG. 5B, the convergence c and the focus plane fp are formed at the same position). That is, when the position of the convergence angle-variable lens 204 is shifted in a direction orthogonal to the optical axis Ax2 of the imaging optical system 20, it is possible to adjust the size of the angle of convergence and the formation position of the convergence point c in accordance with the amount of shift. As shown in FIGS. 5A and 5B, it is possible to adjust the convergence point c to an arbitrary position within a range in which the spatial image S' is formed. That is, the range in which the spatial image S' is formed becomes a variable range vr of the convergence point c.

The focus adjustment is performed by fixing the position of the imaging optical system 20 and by making only the position of the imaging device 202 move back and forth along the optical axis Ax2 of the imaging optical system 20. FIG. 5C illustrates an example of a case where the imaging device 202 is made to move backward while the position of the convergence angle-variable lens 204 is maintained to a position shown in FIG. 5B. By making only the position of the imaging device 202 move in this way, it is possible to make only the focus plane fp move to the rear side of the formation position of the spatial image S' without making the position of the convergence point c move from the position shown in FIG. 5B.

Similarly to the above-described embodiments, the positional movement of this imaging device 202 is necessary to be performed in such a manner that a left side and a right side (imaging device 202L and imaging device 202R) are moved in conjunction with each other. In the configuration of this embodiment, the movement of the imaging device 202 is performed with the same posture and in the same direction, so that it is possible to make the left and right imaging devices 202L and 202R move integrally with each other. Therefore, it is possible to make the imaging devices 202R and 202L move in parallel with the optical axis Ax1 of the objective optical system 10 and the optical axis Ax2 of the imaging optical system 20 with the imaging devices being fixed to the same member. Therefore, it is possible to make the mechanism simple, and it also becomes easy to maintain the imaging planes of the left and right imaging devices 202L and 202R on the same plane. As a result, it is possible to easily obtain an effect of securing reliability with respect to a change with the passage of time.

Furthermore, similarly to the configuration described in the second embodiment, the imaging plane of the imaging device 202 is maintained to be orthogonal to the optical axis Ax1 of the objective optical system 10 and the optical axis Ax2 of the imaging optical system 20, so that the focus plane is also orthogonal to the optical axis Ax1 and the optical axis Ax2 as described above. Therefore, there is an advantage in that focus planes of left and right parallax images become the same as each other. As a result, even in a convergence state, a trapezoidal distortion does not occur in images obtained in the left and right imaging sections 2L and 2R. Therefore, it is possible to obtain a preferable parallax image without performing separate image processing at a later stage.

6. Fourth Embodiment

A stereoscopic imaging apparatus 1-4 according to a fourth embodiment of the present disclosure will be described with reference to FIGS. 6A and 6B. A configuration of the stereoscopic imaging apparatus 1-4 is basically the same as the configuration shown in FIG. 1. The front-side principal point sR of the lens of the imaging optical system 20R and the front-side principal point sL of the lens of the imaging optical system 20L are disposed at positions distant from the optical axis Ax1 of the objective optical system 10 by a distance of d/2. In addition, the directions of the imaging optical system 20R and the imaging optical system 20L are adjusted in such a manner that the optical axis Ax2R of the imaging optical system 20R and the optical axis Ax2L of the imaging optical system 20L intersect each other on the optical axis Ax1 of the objective optical system 10. The optical axis Ax2R of the imaging optical, system 20R and the optical axis Ax2L of the imaging optical system 20L intersect each other at a point c that is distant from the focal point F of the objective optical system 10 by a distance δ.

Figure 6A:
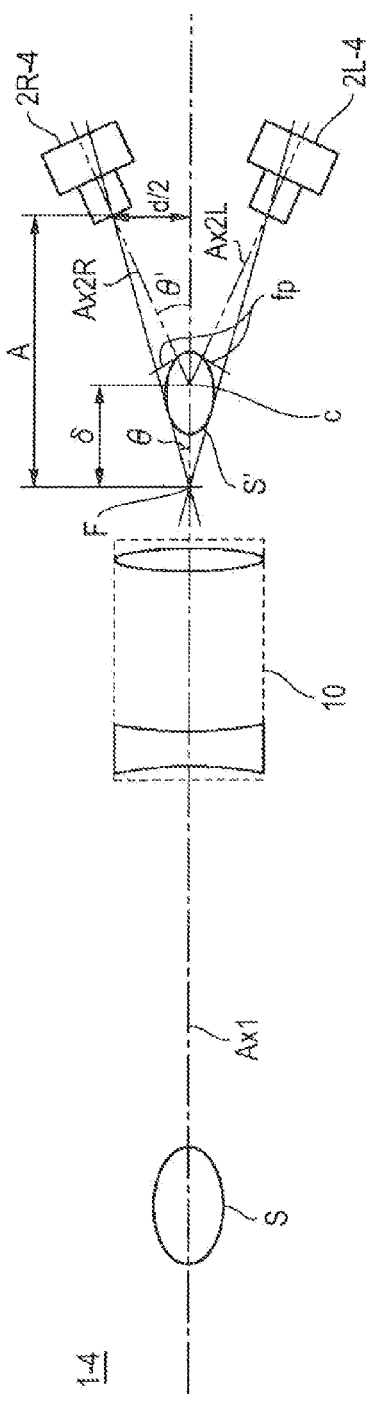
Figure 6B:
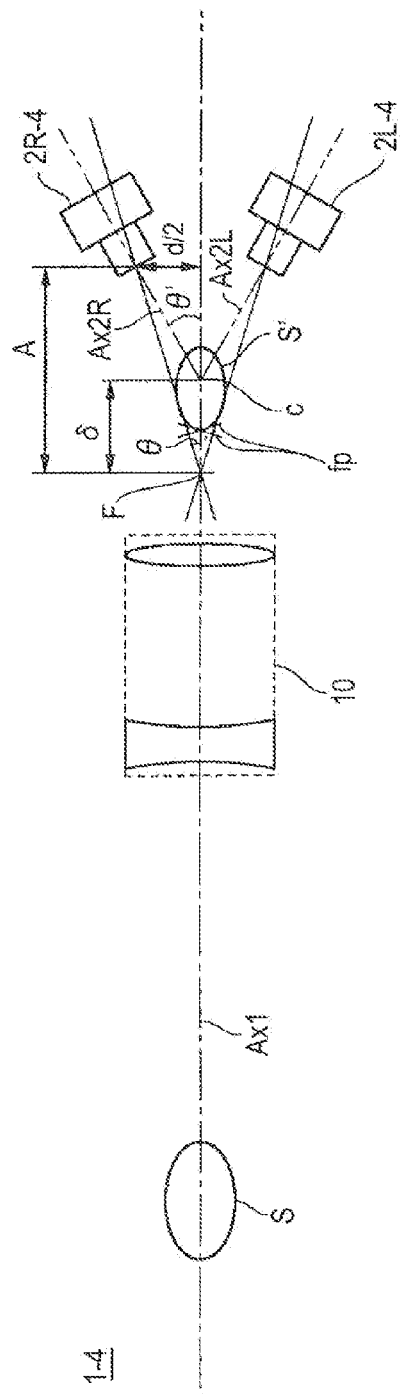

In FIGS. 6A and 6B, an angle made by a line connecting the focal point F of the objective optical system 10 and the front-side principal point sR (sL) of the lens of the imaging optical system 20, and the optical axis Ax1 of the objective optical system 10 is also set to θ. In addition, an angle made by the optical axis Ax2 of the imaging optical system 20 and the optical axis Ax1 of the objective optical system 10 is set to θ'.

A focus adjustment operation by the stereoscopic imaging apparatus 1-4 is performed by controlling a position and a posture of the imaging section 2. More specifically, the imaging section 2 is made to move so that the position of the front-side principal point s of the imaging optical system 20 moves along a line connecting the front-side principal point s of the imaging optical system 20 and the focal point F of the objective optical system 10. Furthermore, the posture of the imaging section 2 is controlled so that the optical axes Ax2 of the imaging optical system 20 intersect each other at any time at an intersection point c on the optical axis Ax1 of the objective optical system 10. That is, the direction of the imaging section 2 is adjusted so that the angle θ' made by the optical axis Ax2 of the imaging optical system 20 and the optical axis Ax1 of the objective optical system 10 satisfies the following formula 3 described above.

$$\text{Angle } \theta' = \arctan(d/2(A-\delta)) \quad \text{(formula 3)}$$

FIG. 6B shows a diagram in which the dispositional position of the imaging section 2 is moved from the position shown in FIG. 6A in a direction to be close to the spatial image S'. By moving the entirety of the imaging section 2, the position of the front-side principal point s of the lens of the imaging optical system 20 in the imaging section 2 moves toward a front side along a line indicated by a solid line connecting the front-side principal point s of the imaging optical system 20 and the focal point F of the objective optical system 10. In this way, by moving the imaging section 2, it is possible to perform the focus adjustment while constantly maintaining "tan θ=d/2A".

"d/2" represents a length of a perpendicular line drawn from the front-side principal point s of the lens of the imaging optical system 20 to the optical, axis Ax1 of the objective optical system 10, and "A" represents a distance between the intersection point x at which the perpendicular line interconnects the optical axis Ax1 of the objective optical system 10 and the focal point F of the objective optical system 10. When the imaging section 2 is made to move in this way, it is possible to perform the focus adjustment while not changing the length of the effective IADed.

Furthermore, FIG. 6B illustrates a state where the postures of the imaging section 2R and 2L are inclined to an inner side (optical axis Ax1 side of the objective optical system 10) from the state shown in FIG. 6A, respectively. At this time, the posture of the imaging sections 2R and 2L is adjusted in such, a manner that the angle θ' made by the optical axis Ax2 of the imaging optical system 20 and the optical axis Ax1 of the objective optical system 10 satisfies the above-described formula 3. When the posture of the imaging section 2 is controlled in this manner, it is possible to change only the focus position (the formation position of the focus plane fp) to an arbitrary position on the spatial image S' while fixing the position, at which the convergence point c is formed. That is, according to the stereoscopic imaging apparatus 1-4 of the fourth embodiment, it is possible to perform the focus adjustment without changing the length of the effective IADed and the position of the convergence point c.

7. Modification of Fourth Embodiment

Figure 7A:
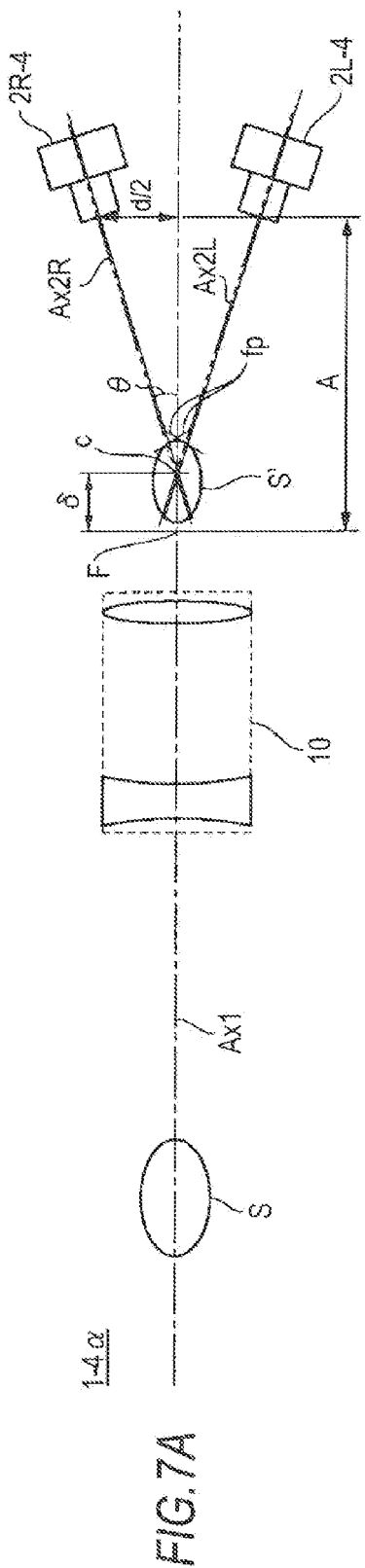
Figure 7B:
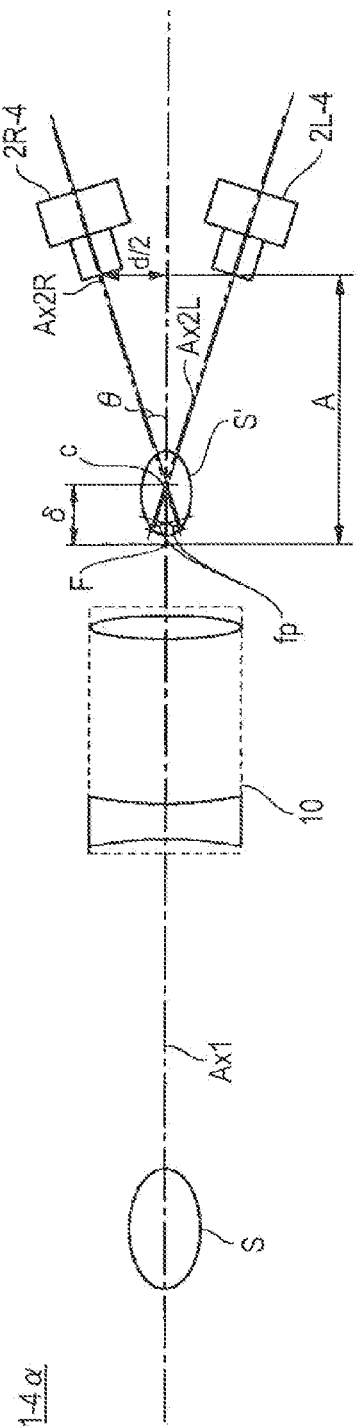

In addition, in a case where as a lens of the objective optical system 10, a lens having a short focal length f such as a wide angle lens is used, it may be configured in such a manner that the position of the front-side principal point s of the lens of the imaging optical system 20 is made to move along a line connecting the front-side principal point s of the imaging optical system 20 and the convergence point c. FIGS. 7A and 7B illustrate an example of a stereoscopic imaging apparatus 1-4α configured in this manner. In the stereoscopic imaging apparatus 1-4α, the imaging section 2 is made to move along the line connecting the front-side principal point s of the imaging optical system 20 and the convergence point c instead of the line connecting the front-side principal point s of the imaging optical system 20 and the focal point F of the objective optical system 10.

FIG. 7B illustrates a state where the imaging section 2 is made to move a front side along the line connecting the front-side principal point s of the imaging optical system 20 and the convergence point c from the position shown in FIG. 7A. In this manner, when the focus adjustment is performed by making the imaging section 2 move along the line connecting the front-side principal point s of the imaging optical system 20 and the convergence point c, the position of the convergence point c does not move in conjunction with the focus adjustment operation. Therefore, in the stereoscopic imaging apparatus 1-4α, it is possible to perform the focus adjustment by making only the position of the front-side principal point s of the imaging optical system 20 of the imaging section 2 without performing the posture control of the imaging section 2.

However, when the imaging section. 2 moves along the line connecting the front-side principal point s of the imaging optical system 20 and the convergence point c, the distance A varies. That is, a value of (a distance L from the rear-side principal point of the objective optical system 10 to the front-side principal point s of the imaging optical, system 20)–(a focal length f of the objective optical system 10), which is used for calculating the effective IADed, also varies. However, when the imaging section 2 moves along the line connecting the front-side principal point s of the imaging optical system 20 and the convergence point c, the variation in a distance d between the front-side principal point sR of the imaging optical system 20R and the front-side principal point sL of the imaging optical system 20L is also proportional to the variation in the distance A. Furthermore, when as the lens of the objective optical system 10, a lens having a short focal length f is used, a ratio of δ, which is a distance from the focal point F of the objective optical system 10 to the convergence point c, with respect to the distance A becomes extremely small. That is, the value of "|f/(L−f)|" that is used for calculating the effective IADed becomes negligibly small. Therefore, even when the imaging section 2 moves along the straight line connecting the convergence point c and the front-side principal point s of the imaging optical system 20, the effective IADed barely varies.

According to the stereoscopic imaging apparatus 1-4α of the modification of the fourth embodiment, it is possible to perform the focus adjustment without controlling the posture of the imaging section 2, so that the mechanism of the stereoscopic imaging apparatus 1-4α and the control may become simple. Therefore, it is possible to obtain the effect of reducing the cost of the stereoscopic imaging apparatus 1-4α.

8. Fifth Embodiment

Next, a configuration, and an operation of a stereoscopic imaging apparatus 1-5 according to a fifth embodiment of the present disclosure will be described with reference to FIGS. 8A and 8B. An arrangement of each unit making up the stereoscopic imaging apparatus 1-5 is substantially the same as that described with reference to FIGS. 6A and 6B as the fourth embodiment. A difference from the stereoscopic imaging apparatus 1-4 according to the fourth embodiment is that the focus adjustment is performed by separately controlling the lens of the imaging optical system 20 and the imaging device 202.

Figure 8A:
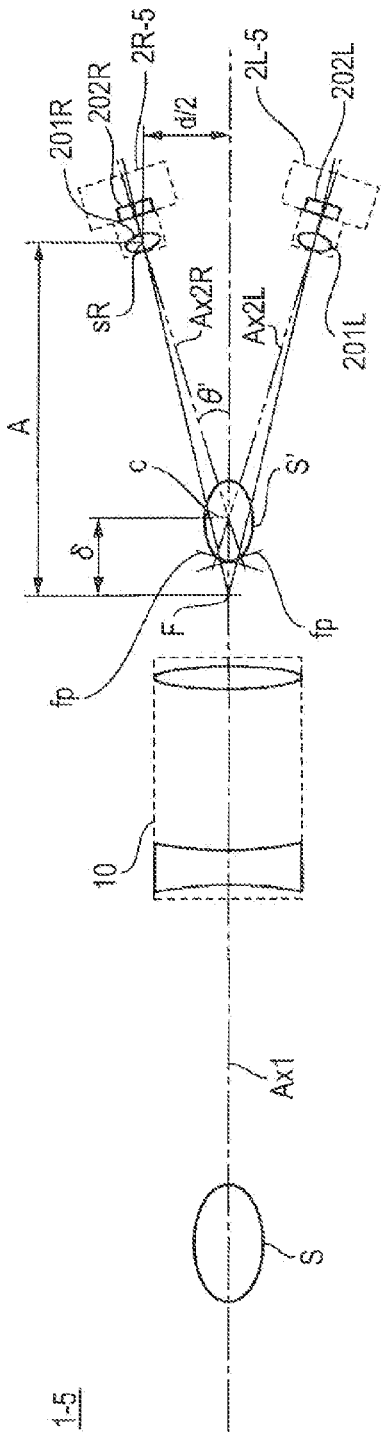
Figure 8B:
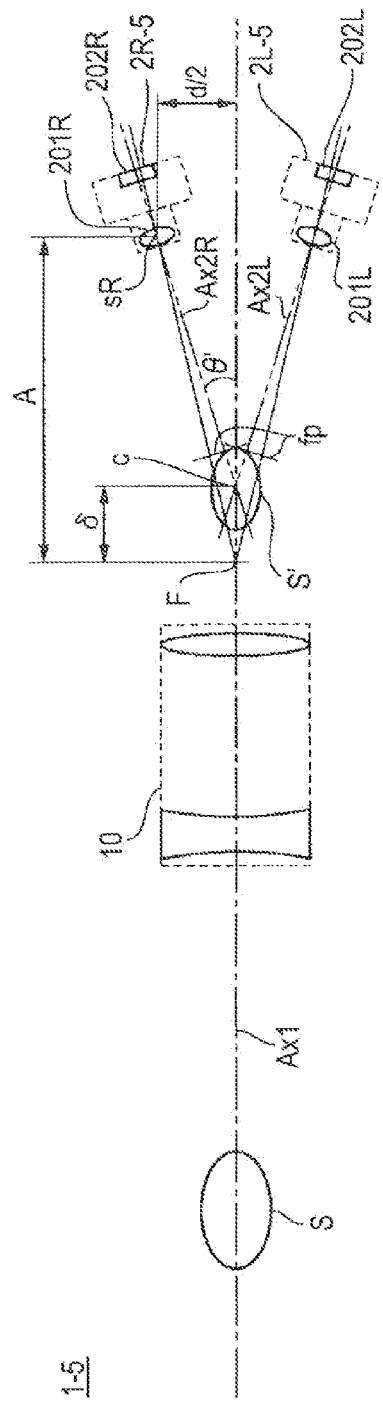

FIG. 8A shows a diagram illustrating a state in which the position of the imaging optical system 20 of the imaging section 2 with respect to the imaging device 202 is adjusted to a position to be focused to a distant view. FIG. 8B shows a diagram illustrating a state in which the focus adjustment is performed to be focused to a close-range view from the state that is focused to the distant view. As shown in FIG. 8B, when the position of the front-side principal point s of the lens of the imaging optical system 20 is made to move in a direction to be distant from the imaging device 202, the focus plane fp moves backward and therefore the focus is adjusted to the close-range. When the movement of the front-side principal point s of the lens of the imaging optical system 20 is performed along a line indicated by a solid line connecting the front-side principal point s of the imaging optical system 20 and the focal point F of the objective optical system 10, it is possible to perform the focus adjustment without changing the effective IADed.

However, the movement of the position of the front-side principal point s of the imaging optical system 20 in a direction to be distant from the imaging device 202 indicates that the distance A becomes shorter. In the stereoscopic imaging apparatus 1-4 of the fourth embodiment, the posture of the imaging section 2 is also controlled in accordance with the variation of the distance A, and thereby the focus adjustment is performed without changing the position of the convergence point, (intersection point c). On the contrary, in the stereoscopic imaging apparatus 1-5 according to this embodiment, the same control is performed by shifting the central position of the imaging device 202 in a direction to be distant from the optical axis Ax1 of the objective optical system 10 in accordance with the variation of the distance A. That is, the dispositional position of the imaging device 202 is adjusted in such a manner that the angle θ' made by the optical axis Ax2 of the imaging optical system 20 and the optical axis Ax1 of the objective optical system 10 becomes a value satisfying the following formula 3 described above.

Angle θ'=arctan $(d/2(A-\delta))$ (formula 3)

When this control is performed, it is also possible to perform the focus adjustment independently from the control of the position of the convergence point c without changing the effective IADed.

In addition, in a case where the stereoscopic imaging apparatus to which the present disclosure is applicable has a camera shake correcting function, or the like, the movement of the front-side principal point s of the lens of the imaging optical system 20 may be performed along a line connecting the rear-side principal point, of the imaging optical system 202 and the center of a read-out range by the imaging device 202.

9. Modification of Fifth Embodiment

In addition, as the imaging optical system 20, it is possible to adopt a lens such as an inner focus type lens and a rear focus type lens in which the position of the front-side principal point s is barely changed due to the focus adjustment. In this case, the distance A is not changed even when the focus adjustment is performed, so that it is not necessary to perform a control such as the posture control of the imaging section 2 and the position control of the imaging device 202 for constantly maintaining the position of the convergence point c. Therefore, as shown in FIGS. 9A and 9B, when a focusing lens 205 that is a lens other than a pre-group is made to move back and forth along the optical axis Ax2 of the imaging optical system 20, it is possible to adjust the focusing position to a position different from the position of the convergence point c while not changing the effective IADed. In addition, the same configuration may be realized by using a focal point-variable optical device or the like to the imaging optical system 20.

10. Modifications of First to Fifth Embodiments

In addition, in the above-described first to fifth embodiments, a case where each unit making up the imaging section 2R (2L) is independently moved to adjust the position of the front-side principal point sR (sL) of the imaging optical system 20R (20L), the position of the imaging device 202R (202L), or the like is described as an example, but it is not limited thereto. The focus adjustment may be formed by moving the entirety of the imaging section 2R (2L). In this case, the movement of the imaging section 2R (2L) may be performed along a line that passes the front-side principal point sR (sL) of the imaging optical system 20R (20L) and that is parallel with the optical axis Ax1 of the objective optical system 10.

Figure 10:
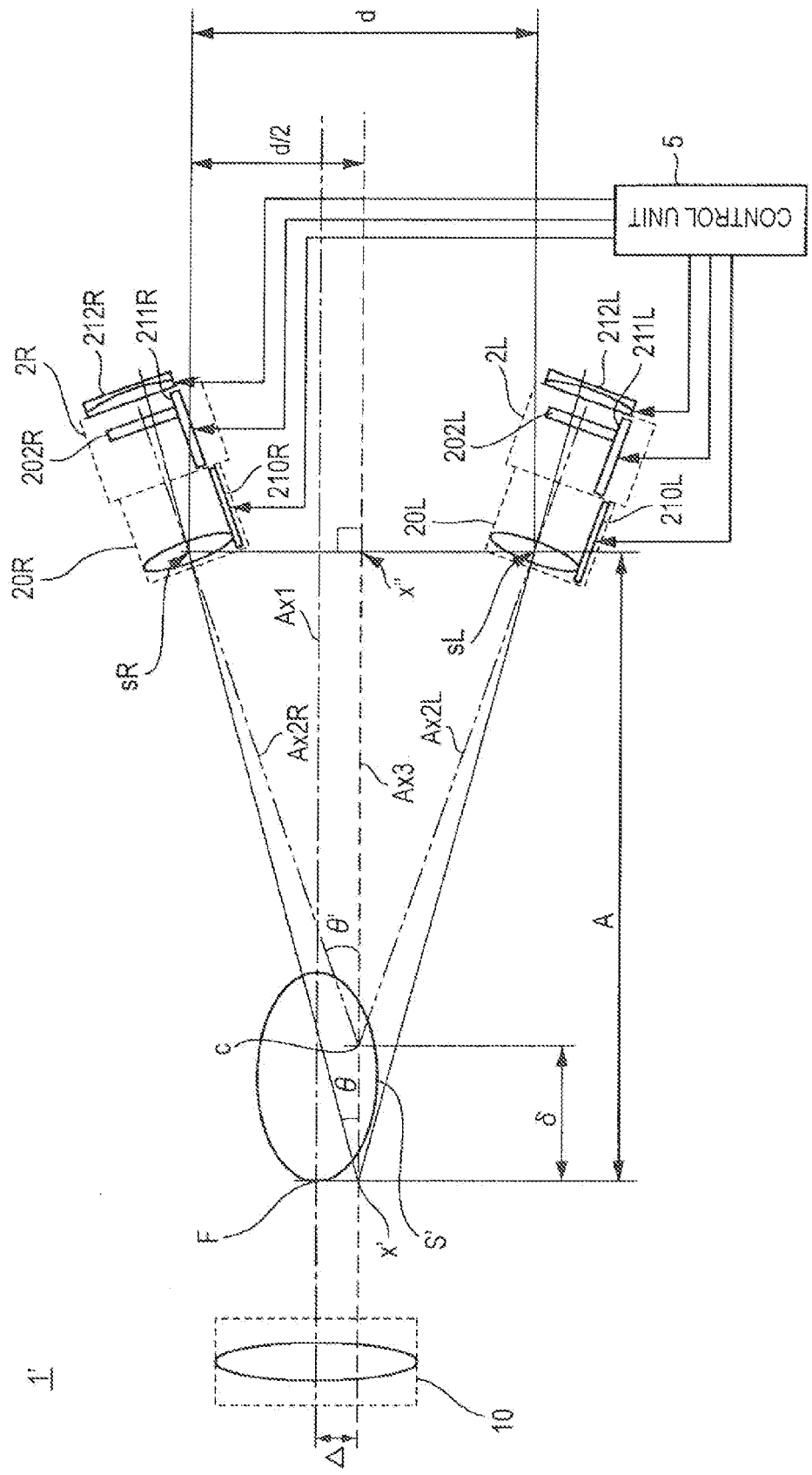
FIG. 10 is a schematic diagram illustrating a configuration example of the stereoscopic imaging apparatus in a case where the convergence point, is set on an axis other than the optical axis of the objective optical system according to a modification of the present disclosure.

In addition, in each embodiment described above, a case where the optical axis Ax2R of the imaging optical system 20R and the optical axis Ax2L of the imaging optical system 20L are made to intersect each other on the optical axis Ax1 of the objective optical system 10 is described as an example, but it is not limited thereto. As shown in FIG. 10, a stereoscopic imaging device 1' may be configured in such a manner that the optical axis Ax2R of the imaging optical system 20R and the optical axis Ax2L of the imaging optical system 20L intersect each other on an axis Ax3 that is parallel with the optical axis Ax1 of the objective optical system 10. The axis Ax3 is indicated by a long dashed line in FIG. 10. It is assumed that this axis Ax3 is present on a plane including the front-side principal point sR (sL) of the imaging optical system 20R (20L) and the optical axis Ax1 of the objective optical system 10.

In addition, a value of Δ representing a distance between the optical axis Ax1 of the objective optical system 10 and the axis Ax3 varies due to a position (vertical direction in FIG. 10) at which the convergence point c that is an intersection point between the optical axis Ax2R of the imaging optical system 20R and optical axis Ax2L of the imaging optical system 20L is disposed. In a case where each imaging optical system 20 is disposed in such a manner that the optical axis Ax2 of each imaging optical system 20 and the axis Ax3 are parallel with each other, a point at which respective straight lines connecting the rear-side principal point of each imaging optical system 20 and the center of each imaging device 202 intersect each other on the axis Ax3 becomes the convergence point c.

In a case where the stereoscopic imaging device 1' is configured as described above, the adjustment (focus adjustment) of the dispositional position and the movement of each unit, which is described, in each of the above-described embodiments, may be performed with respect to the axis Ax3. More specifically, the focus adjustment is performed by making each of the imaging optical systems 20 making a pair, and/or each of the imaging devices 202 move in conjunction with each other, so that line segments connecting an intersection point x' (second intersection point) at which a perpendicular line (second perpendicular line) drawn from the focal point F of the objective optical system 10 to the axis Ax3 and the axis Ax3 intersect each other, and the front-side principal points s of the respective imaging optical systems 20 have the same length as each other.

In addition, in a case where the focus adjustment is performed by making an angle θ' made by the optical axis Ax2R (Ax2L) of the imaging optical system 20R (20L) and the axis Ax3 variable, the posture adjustment of each imaging section 2, or the position of each imaging optical system 20 or the position of each imaging device 202 is adjusted so that the angle θ' satisfies the following formula described above.

Angle θ'=arctan $(d/2(A-\delta))$ (formula 3)

In addition, in a case where each imaging optical system 20 is disposed in such a manner that the optical axis Ax2 of each imaging optical system 20 is parallel with the axis Ax3, the angle θ' is shown as an angle made by a straight line passing through the front-side principal point s of the imaging optical system 20 and the center of the imaging device 202, and the axis Ax3.

In the above-described formula, "d" represents an inter-lens distance of the respective imaging optical systems 20 that make a pair. Therefore, "d/2" becomes a length of a perpendicular line (third perpendicular line) drawn from the front-side principal point sR (sL) of the imaging optical system 20R (20L) to the axis Ax3. In addition, "A" represents a length of a line segment connecting an intersection point x" (third intersection point) at which the third perpendicular line and the axis Ax3 intersect each other and the intersection point x'. "δ" represents a length of a line segment connecting the convergence point c and the intersection point x'.

In addition, in FIG. 10, an example in which the axis Ax3 is provided on a plane including the front-side principal point sR (sL) of the imaging optical system 20R (20L) and the optical axis Ax1 of the objective optical system 10 is shown, but it is not limited thereto. That is, the axis Ax3 may be disposed at a position in which a plane including the front-side principal point sR (sL) of the imaging optical system 20R (20L) and a plane including the axis Ax3 and the optical axis Ax1 of the objective optical system 10 are not the same as each other. That is, the axis Ax3 may be disposed at an arbitrary position of 360° about the optical axis Ax1 as long as the axis Ax3 is disposed at a position that is parallel with the optical axis Ax1 of the objective optical system 10.

Figure 11:
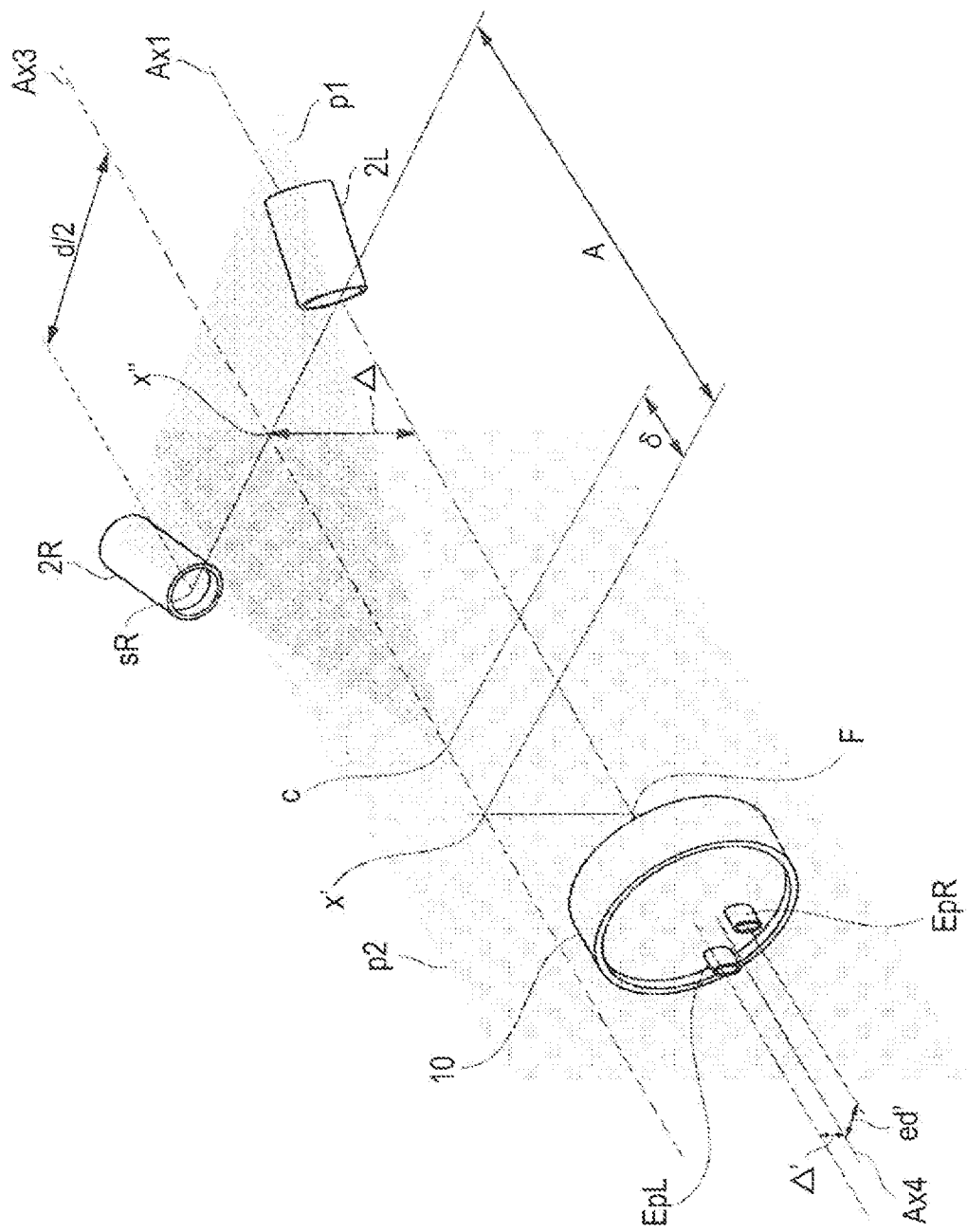
FIG. 11 is a schematic diagram illustrating a configuration example of the stereoscopic imaging apparatus in a case where the convergence point is set on an axis other than the optical axis of the objective optical system according to a modification of the present disclosure.

FIG. 11 illustrates an example in which the axis Ax3 is disposed at a position in which a plane p1 indicated by a triangle including the front-side principal points sR (sL) of the imaging optical system 20R (20L) and a plane p2 including the optical axis Ax1 of the objective optical system 10 and the axis Ax3 are orthogonal to each other. In FIG. 11, the imaging sections 2R and 2L and the objective optical system 10 are schematically indicated as a cylindrical shape. In addition, it is assumed, that the objective optical system 10 shown in FIG. 11 is formed of a convex lens.

In FIG. 11, the axis Ax3 is set at a position that is vertically distant in an upward direction by a distance Δ with respect to the optical axis Ax1 of the objective optical system 10. That is, the imaging optical systems 20R and 20L are disposed so that the convergence point (intersection point c) is formed on the axis Ax3. In the case of this disposition, an effective pupil. EpR corresponding to the imaging section 2R and an effective pupil EpL corresponding to the imaging section 2L are formed at positions that are vertically deviated in a downward direction with respect to the optical axis Ax1 of the objective optical system 10. When the axis formed at a position that is deviated in a downward direction on the plane p2 from the optical axis Ax1 of the objective optical system 10 by a distance Δ' is set as an axis Ax4, for example, in the case of the effective pupil BpR corresponding to the imaging section 2R, this effective pupil EpR is formed at a position deviated from the axis Ax4 by a distance ed' in a right direction. In the example shown in FIG. 11, since it is assumed that a convex lens is used as the objective optical system 10, the positions at which respective effective pupils Ep are formed are horizontally inverted with the axis Ax4 interposed therebetween with respect to the actual dispositional positions of the imaging sections 2R and 2L.

Figure 12:
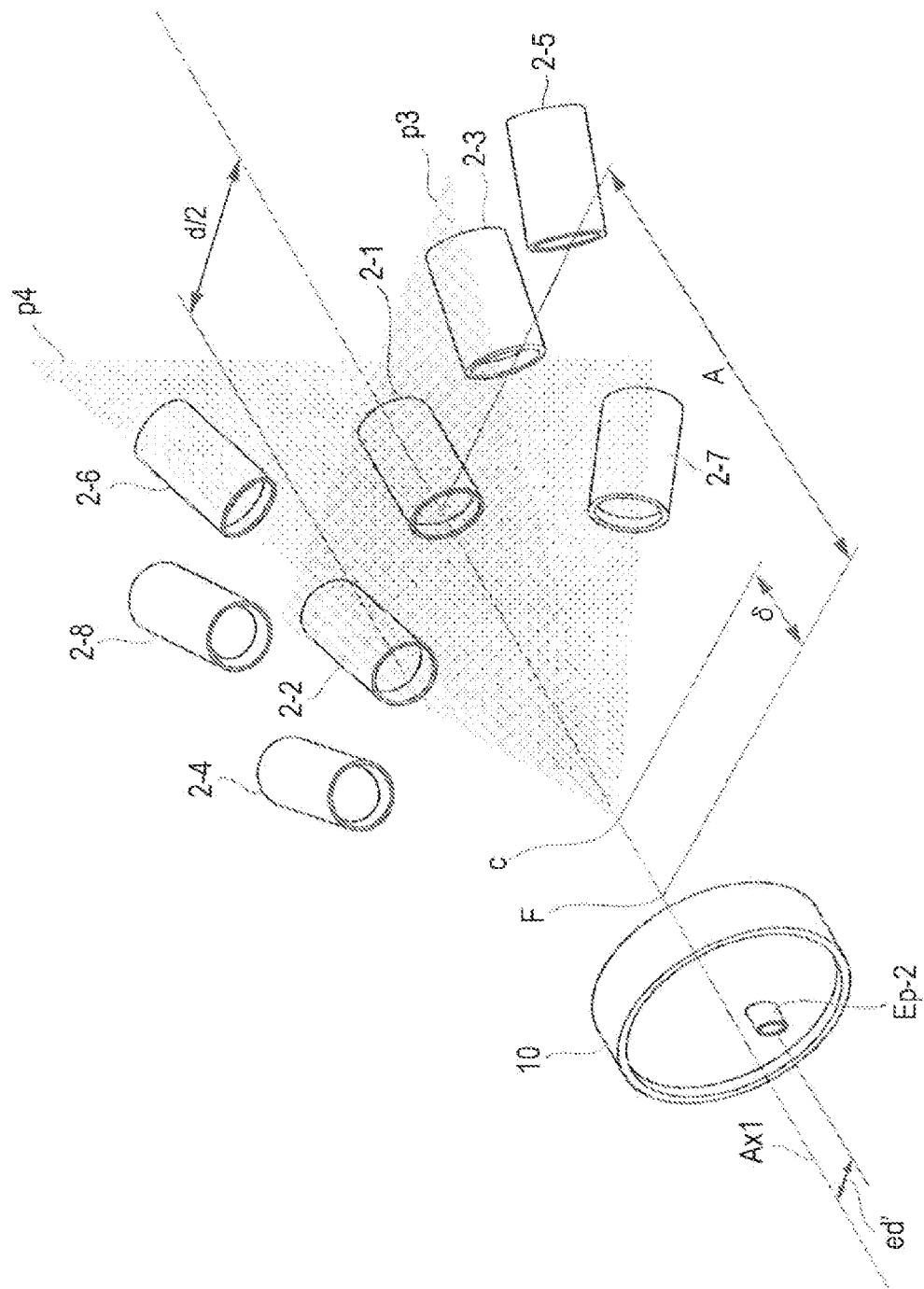
FIG. 12 is a schematic diagram illustrating a configuration example of the stereoscopic imaging apparatus in a case where a plurality of imaging sections are provided according a modification of the present disclosure.

In addition, in the above-described embodiments, an example in which two imaging sections 2 are provided for acquiring left and right parallax images is illustrated, but it is not limited thereto. The present disclosure is applicable to a configuration in which three or more plural imaging sections 2 are provided. FIG. 12 illustrates an example in which eight imaging sections 2 are provided. An imaging section 2-1 is disposed on the optical axis Ax1 of the objective optical system 10, an imaging sections 2-2 and 2-3 are disposed at positions that are horizontally symmetrical to each other with the imaging section 2-1 interposed therebetween. In addition, imaging sections 2-4 and 2-5 are disposed at the outside (in a direction to be distant from the optical axis Ax1) of the imaging sections 2-2 and 2-3. All of the front-side principal points s of the respective imaging optical systems 20 of the respective imaging sections 2 are disposed on a plane p3. In addition, imaging sections 2-6 and 2-7 are disposed at positions that are vertically symmetrical to each other with the imaging section 2-1 interposed therebetween. It is assumed that each principal point s in the imaging sections 2-6 and 2-7 is disposed on the same plane p4. In addition, an imaging section 2-8 is disposed at a position (an upper-left position in the drawing) that does not belong to the plane p3 and the plane p4.

The disposition (angle) of these imaging sections 2-1 to 2-8 is adjusted to positions at which the optical axis Ax2, or a line connecting the front-side principal point s and the center of the imaging device 202 intersects the intersection point c. Through this disposition, for example, an effective pupil Ep-2 corresponding to the imaging section 2-2 is formed at a position that is obliquely deviated from the optical axis Ax1 of the objective optical system 10 by a distance ed' in a lower-right direction.

In a case where the plurality of imaging sections 2 are disposed in this way, when the focus adjustment is performed, the imaging sections 2-2 and 2-3, the imaging sections 2-4 and 2-5, and the imaging sections 2-6 and 2-7 may be controlled to move in conjunction with each other as respective pairs.

In addition, in the above-described respective embodiments, a case in which imaging sections 2, which are disposed at positions that are symmetrical to each other with the optical axis Ax1 of the objective optical system 10 or the axis Ax3 interposed therebetween, is set as a pair, and a control is performed by making the respective imaging optical systems 20 in the respective imaging sections 2 and/or the respective imaging devices 202 corresponding to the respective imaging optical systems 20 move in conjunction with each other is illustrated as an example. However, the present disclosure may be applicable to a case in which the control is performed without making these move in conjunction with each other. However, even in this case, it is necessary to perform the focus adjustment so that as described above, the length ratio of the perpendicular line d/2 with respect to the line segment A becomes constant. Through this control, the formation position of each effective pupil Ep corresponding to each imaging section 2 does not vary along with the focus adjustment.

In addition, the stereoscopic imaging apparatus according to the present disclosure, may have the following configuration.

(1) A stereoscopic imaging apparatus including an objective optical system that has a function of forming a subject as a real image or a virtual image; a plurality of imaging optical systems that allow a plurality of light beams of the subject, which are emitted in different paths of the objective optical system by a plurality of independent optical systems, to be imaged again as a parallax image, respectively; a plurality of imaging devices that are provided in correspondence with the plurality of imaging optical systems, and convert the parallax image that is imaged by the plurality of imaging optical systems into an image signal; and a control unit that performs a control for disposing or moving a front-side principal point of each of the imaging optical systems, so that a ratio of a length of a perpendicular line vertically drawn from each front-side principal point of the plurality of imaging optical systems to an optical axis of the objective optical system with respect to a length of a line segment connecting an intersection point at which the perpendicular line and the optical axis of the objective optical system intersect each other and a focal point of the objective optical system becomes constant.

(2) The stereoscopic imaging apparatus according to item (1), in which the control unit performs focus adjustment by making each of the imaging optical systems making a pair, and/or each of the imaging devices, which are provided in correspondence with each of the imaging optical systems making a pair, move in conjunction with each other, so that in regard to a position between the respective imaging optical systems make a pair and are disposed to be symmetrical to each other with respect to the optical axis of the objective optical system, line segments connecting from the focal point of the objective optical system to the front-side principal points of the respective imaging optical systems have the same length as each other.

(3) The stereoscopic imaging apparatus according to item (1) or (2), in which in the focus adjustment, the control unit makes the focus plane of each of the imaging optical systems move within a range of a finite distance from the imaging optical system.

(4) The stereoscopic imaging apparatus according to any one of items (1) to (3), in which the control unit makes the relative position of each of the imaging devices with respect to the front-side principal point of each of the imaging optical systems vary by making the imaging device move along either an optical axis of each of the imaging optical systems or a straight line connecting a rear-side principal point of each of the imaging optical systems and a center of each of the imaging devices.

(5) The stereoscopic imaging apparatus according to any one of items (1) to (3), in which each of the imaging optical systems is disposed in such a manner that an axis thereof is parallel with the optical axis of the objective optical system, and each of the imaging devices is disposed in such a manner that an imaging plane thereof is orthogonal to the optical axis of the objective optical system, and the control unit performs the focus adjustment by making each of the imaging devices move in the same direction along a straight line connecting a rear-side principal point of each of the imaging optical systems and a center of each of the imaging devices.

(6) The stereoscopic imaging apparatus according to any one of items (1) to (3), in which a concave lens is used as one of the lenses of each of the imaging optical systems, and the control unit performs the focus adjustment by making an angle of convergence of the stereoscopic imaging apparatus variable by moving the concave lens in a direction orthogonal to the optical axis of the objective optical system, and by making each of the imaging devices move in the same direction along the optical axis of each of the imaging optical systems.

(7) The stereoscopic imaging apparatus according to any one of items (1) to (3), in which in a case where an inter-lens distance of the respective imaging optical systems that make a pair is set to d, a length of the perpendicular line or a length of a third perpendicular line that is a perpendicular line drawn from each front-side principal point of the plurality of imaging optical systems to the axis is set to d/2, a length of a line segment connecting an intersection point at which the perpendicular line and the optical axis of the objective optical system intersect each other and the focal point of the objective optical system, or a length of a line segment connecting a third intersection point that is an intersection point at which the third perpendicular line and the axis intersect each other and the second intersection point is set to A, and a length of a line segment connecting a convergence point, which is a point at which the respective optical axes of the respective imaging optical systems intersect each other or a point at which respective straight lines connecting a rear-side principal point of each of the imaging optical systems and a center of each of the imaging devices intersect each other, and the focal point of the objective optical system or the second intersection point is set to $\delta$, the control unit performs the focus adjustment by performing posture adjustment of each of the imaging sections, which include each of the imaging optical systems and each of the imaging devices, or by performing adjustment of each of the imaging optical systems and/or movement of a position of each of the imaging devices so that an angle $\theta'$ that is an angle made by each optical axis of the respective imaging optical systems and the optical axis of the objective optical system or the axis, or an angle made by the straight line, which connects the rear-side principal point of each of the imaging optical systems and the center of each of the imaging devices, and the optical axis of the objective optical axis or the axis satisfies the following formula.

$$\text{Angle } \theta' = \arctan(d/2(A-\delta))$$

(8) The stereoscopic imaging apparatus according to item (7), in which the control unit performs the focus adjustment by making the lens of each of the imaging optical systems move along a straight line connecting the front-side principal point of each of the imaging optical systems and the focal point of the objective optical system, and by making a position of each of the imaging devices move in a direction to be distant from the optical axis of the objective optical system as the lens of each of the imaging optical systems approaches the focal point of the objective optical system.

(9) The stereoscopic imaging apparatus according to item (7) or (8), in which as each of the imaging optical systems, an inner focus type or rear focus type lens is used, and the control unit performs the focus adjustment by controlling a position of the lens of each of the imaging optical systems.

The present disclosure contains subject matter related to that disclosed in Japanese Priority Patent Application JP 2011-025304 filed in the Japan Patent Office on Feb. 8, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A stereoscopic imaging apparatus comprising:
   an objective optical system that has a function of forming a subject as a real image or a virtual image;
   a plurality of imaging optical systems that allow a plurality of light beams of the subject, which are emitted in different paths of the objective optical system by a plurality of independent optical systems, to be imaged again as a parallax image, respectively;
   a plurality of imaging devices that are provided in correspondence with the plurality of imaging optical systems, and convert the parallax image that is imaged by the plurality of imaging optical systems into an image signal; and
   a control unit, that performs a control for disposing or moving a front-side principal point of each of the imaging optical systems, so that a ratio of a length of a perpendicular line vertically drawn from each front-side principal point of the plurality of imaging optical systems to an optical axis of the objective optical system with respect to a length of a line segment connecting an intersection point at which the perpendicular line and the optical axis of the objective optical system intersect each other and a focal point of the objective optical system becomes constant, and the control unit performs focus adjustment by moving each of the imaging optical systems of a pair of imaging optical systems without changing an inter-lens distance of the respective pair of imaging optical systems, the inter-lens distance of the respective pair of imaging optical systems being a distance between respective virtual pupils of the pair of imaging optical systems, and each of the virtual pupils being a point through which light beams, which pass through the objective optical system and through a lens center of a respective imaging optical system, pass.

2. The stereoscopic imaging apparatus according to claim 1, wherein the control unit performs focus adjustment by moving the image optical systems in conjunction with each other, so that in a case were a line, which is located at a position that is symmetrical with respect to the optical axis of the objective optical system, or a position, that is on a plane including each front-side principal point of each of the imaging optical systems and the optical axis of the objective optical system and that is parallel with the optical axis of the objective optical system and is distant from the optical axis of the objective optical system by a predetermined distance, is set as an axis, in regard to a position between, the respective imaging optical systems that make a pair and are disposed to be symmetrical to each other with respect to the axis, line segments connecting a focal point of the objective optical system and front-side principal points of the respective imaging optical systems or line segments connecting a second intersection point, which is an intersection point at which a second perpendicular line drawn from the focal point of the objective optical system to the axis and the axis intersect each other, and the front-side principal points of the respective imaging optical systems have the same length as each other.

3. The stereoscopic imaging apparatus according to claim 2, wherein in the focus adjustment, the control unit makes a focus plane of each of the imaging optical systems move within a range of a finite distance from the imaging optical system.

4. The stereoscopic imaging apparatus according to claim 3, wherein the control unit makes a relative position of each of the imaging devices with respect to the front side principal point of each of the imaging optical systems vary by making the imaging device move along either an optical axis of each of the imaging optical systems or a straight line connecting a rear-side principal point of each of the imaging optical systems and a center of each of the imaging devices.

5. The stereoscopic imaging apparatus according to claim 3, wherein each of the imaging optical systems is disposed in such a manner that an axis thereof is parallel with the optical axis of the objective optical system, and each of the imaging devices is disposed in such a manner that an imaging plane thereof is orthogonal to the optical axis of the objective optical system, and the control unit performs the focus adjustment by making each of the imaging devices move in the same direction along a straight line connecting a rear-side principal point of each of the imaging optical systems and a center of each of the imaging devices.

6. The stereoscopic imaging apparatus according to claim 3, wherein a concave lens is used as one of the lenses of each of the imaging optical systems, and the control unit performs the focus adjustment by making an angle of convergence of the stereoscopic imaging apparatus variable by moving the concave lens in a direction orthogonal to the optical axis of the objective optical system, and by making each of the imaging devices move in the same direction along the optical axis of each of the imaging optical systems.

7. The stereoscopic imaging apparatus according to claim 3, wherein in a case where the inter-lens distance of the respective imaging optical systems that make a pair is set to d, a length of the perpendicular line or a length of a third perpendicular line that is a perpendicular line drawn from each front-side principal point of the plurality of imaging optical systems to the axis is set to d/2, a length of a line segment connecting an intersection point at which the perpendicular line and the optical axis of the objective optical system intersect each other and the focal point of the objective optical system, or a length of a line segment connecting a third intersection point that is an intersection point at which the third perpendicular line and the axis intersect each other and the second intersection point is set to A, and a length of a line segment connecting a convergence point, which is a point at which the respective optical axes of the respective imaging optical systems intersect each other or a point at which respective straight lines connecting a rear-side principal point of each of the imaging optical systems and a center of each of the imaging devices intersect each other, and the focal point of the objective optical system or the second intersection point is set to δ, the control unit performs the focus adjustment by performing posture adjustment of each of imaging sections, which include each of the imaging optical systems and each of the imaging devices, or by performing adjustment of each of the imaging optical systems and/or movement of a position of each of the imaging devices so that an angle θ' that is an angle made by each optical axis of the respective imaging optical systems and the optical axis of the objective optical system or the axis, or an angle made by the straight line, which connects the rear-side principal point of each of the imaging optical systems and the center of each of the imaging devices, and the optical axis of the objective optical axis or the axis satisfies the following formula Angle θ'=arctan(d/2(A−δ)).

8. The stereoscopic imaging apparatus according to claim 7, wherein the control unit performs the focus adjustment by making the lens of each of the imaging optical systems move along a straight line connecting the front-side principal point of each of the imaging optical systems and the focal point of the objective optical system, and by making a position of each of the imaging devices move in a direction to be distant from the optical axis of the objective optical system as the lens of each of the imaging optical systems approaches the focal point of the objective optical system.

9. The stereoscopic imaging apparatus according to claim 7, wherein as each of the imaging optical systems, an inner focus type or rear focus type lens is used, and the control unit performs the focus adjustment by controlling a position of the lens of each of the imaging optical systems.

* * * * *